United States Patent
Konishi

(10) Patent No.: US 11,933,735 B2
(45) Date of Patent: Mar. 19, 2024

(54) OPTICAL DETECTION DEVICE, OPTICAL DETECTION METHOD, METHOD FOR DESIGNING OPTICAL DETECTION DEVICE, SAMPLE CLASSIFICATION METHOD, AND DEFECT DETECTION METHOD

(71) Applicant: OSAKA UNIVERSITY, Osaka (JP)

(72) Inventor: Tsuyoshi Konishi, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 186 days.

(21) Appl. No.: 17/440,896

(22) PCT Filed: Mar. 25, 2020

(86) PCT No.: PCT/JP2020/013495
§ 371 (c)(1),
(2) Date: Sep. 20, 2021

(87) PCT Pub. No.: WO2020/203592
PCT Pub. Date: Oct. 8, 2020

(65) Prior Publication Data
US 2022/0155237 A1    May 19, 2022

(30) Foreign Application Priority Data
Mar. 29, 2019   (JP) .................. 2019-068251

(51) Int. Cl.
*G01N 21/88*       (2006.01)
*G01J 3/18*         (2006.01)
(Continued)

(52) U.S. Cl.
CPC .......... *G01N 21/8806* (2013.01); *G01J 3/18* (2013.01); *G01J 3/42* (2013.01); *G01N 21/31* (2013.01);
(Continued)

(58) Field of Classification Search
CPC .............. G01N 21/8806; G01N 21/31; G01N 2021/8845; G01N 2021/8854;
(Continued)

(56) References Cited

U.S. PATENT DOCUMENTS 5,442,439 A * 8/1995 Battey .................. G01J 3/36
356/328
6,046,808 A * 4/2000 Fateley ................ G01J 3/0218
356/330

(Continued)

FOREIGN PATENT DOCUMENTS

WO      2014/141666      9/2014

OTHER PUBLICATIONS

International Search Report dated Jun. 30, 2020 in International (PCT) Application No. PCT/JP2020/013495.

*Primary Examiner* — Mohamed K Amara
(74) *Attorney, Agent, or Firm* — Wenderoth, Lind & Ponack, L.L.P.

(57) ABSTRACT

An optical detection device is an optical detection device that detects a desired wavelength component included in input light, and includes: a spectrometer including, for instance, a diffraction grating that receives the input light as an input and outputs an alignment of spectra each of which is a duplication of a spectrum of the input light; a second slit array including an array of three or more slits that pass light beams of wavelengths at three or more locations in the alignment of the spectra that are output from the spectrometer; and an imaging element composed of an array of pixels that receive the light beams, having passed through the second slit array, each of the light beams having three or more wavelength components. At least two pitches between slits are different in the array of the three or more slits included in the second slit array.

11 Claims, 21 Drawing Sheets

(51) Int. Cl.
*G01J 3/42* (2006.01)
*G01N 21/31* (2006.01)

(52) U.S. Cl.
CPC ............... *G01N 2021/8845* (2013.01); *G01N 2021/8854* (2013.01)

(58) Field of Classification Search
CPC .. G01N 21/85; G01N 21/94; G01N 2201/129; G01N 21/65; G01J 3/18; G01J 3/42; G01J 3/36; G01K 11/3206
See application file for complete search history.

(56) References Cited

U.S. PATENT DOCUMENTS

| | | | | |
|---|---|---|---|---|
| 6,859,275 | B2* | 2/2005 | Fateley | G01J 3/0232 356/330 |
| 7,248,358 | B2* | 7/2007 | Geshwind | G01J 3/02 356/330 |
| 7,808,635 | B2* | 10/2010 | Chrisp | G01J 3/2803 356/326 |
| 8,305,575 | B1* | 11/2012 | Goldstein | G01J 3/0229 356/326 |
| 8,885,161 | B2* | 11/2014 | Scheeline | G02B 27/4272 356/328 |
| 8,922,783 | B2* | 12/2014 | Bodkin | G01J 3/453 356/451 |
| 9,042,414 | B2* | 5/2015 | Vukovic-Cvijin | G01J 3/433 250/338.5 |
| 9,612,155 | B2* | 4/2017 | Ho | G02B 6/10 |
| 10,481,092 | B2* | 11/2019 | Loock | G01J 3/4406 |
| 10,564,105 | B2* | 2/2020 | Zhao | G01J 3/28 |
| 11,042,775 | B1* | 6/2021 | Richert | G06F 18/22 |
| 11,353,440 | B2* | 6/2022 | Islam | G01N 21/3504 |
| 2002/0044277 | A1* | 4/2002 | Yonezawa | G01N 21/95623 356/237.2 |
| 2002/0090650 | A1* | 7/2002 | Empedocles | B01L 3/502715 435/7.1 |
| 2002/0154315 | A1* | 10/2002 | Myrick | G01J 3/524 359/326 |
| 2003/0189703 | A1* | 10/2003 | Yonezawa | G01N 21/956 356/237.2 |
| 2004/0246477 | A1* | 12/2004 | Moon | H04B 10/07955 356/300 |
| 2007/0076208 | A1* | 4/2007 | Koo | G01J 3/44 356/451 |
| 2007/0296969 | A1* | 12/2007 | Goldstein | G01J 3/14 356/328 |
| 2010/0053609 | A1* | 3/2010 | Chrisp | G01J 3/0291 356/328 |
| 2010/0328659 | A1* | 12/2010 | Bodkin | G01J 3/0205 356/326 |
| 2011/0063615 | A1* | 3/2011 | Shimbo | G01J 3/2803 356/326 |
| 2012/0105846 | A1* | 5/2012 | Funayama | G01J 3/02 356/326 |
| 2012/0206725 | A1* | 8/2012 | Vukovic-Cvijin | H01S 5/4087 356/402 |
| 2012/0229813 | A1* | 9/2012 | Kim | A61B 5/6852 250/226 |
| 2013/0134309 | A1* | 5/2013 | Rapaport | G01J 3/0245 359/332 |
| 2013/0176568 | A1* | 7/2013 | Priore | G01J 3/0224 356/416 |
| 2013/0194481 | A1* | 8/2013 | Golub | G01J 3/0248 348/336 |
| 2013/0296710 | A1* | 11/2013 | Zuzak | G01J 3/10 600/476 |
| 2013/0314765 | A1* | 11/2013 | Padilla | G02F 1/133377 428/209 |
| 2015/0377797 | A1* | 12/2015 | Kolchin | G01N 21/8851 356/237.5 |
| 2016/0033328 | A1* | 2/2016 | Walters | G01J 3/0289 356/326 |
| 2016/0033331 | A1 | 2/2016 | Konishi et al. | |
| 2017/0052118 | A1* | 2/2017 | Loock | G01J 3/021 |
| 2019/0271586 | A1* | 9/2019 | Bayraktar | G01J 3/2823 |
| 2020/0003618 | A1* | 1/2020 | Fujita | G01N 21/27 |
| 2020/0066782 | A1* | 2/2020 | Bierret | H01L 27/14649 |
| 2023/0251133 | A1* | 8/2023 | Yamamoto | G01J 3/18 356/326 |

* cited by examiner

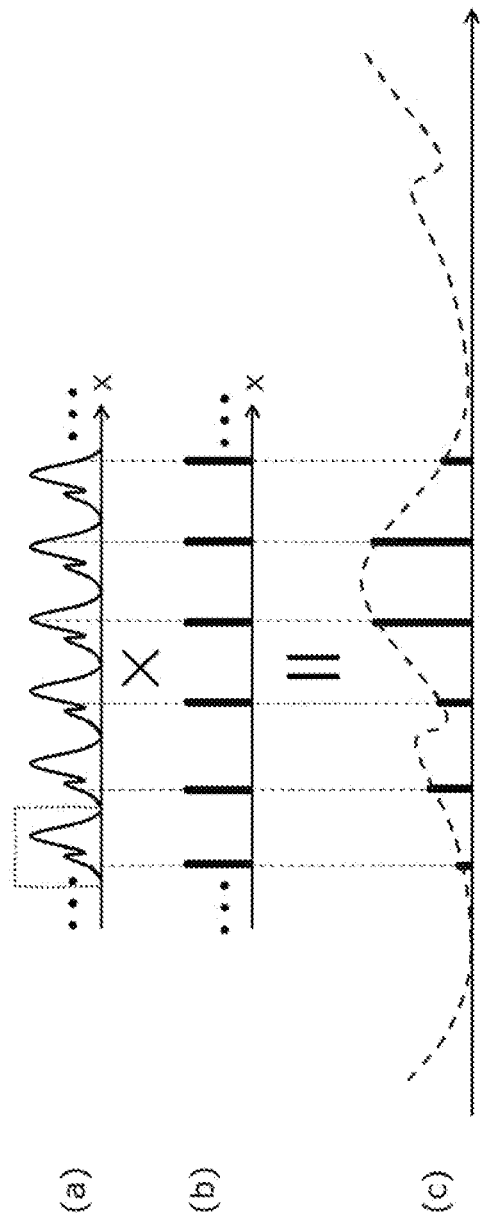

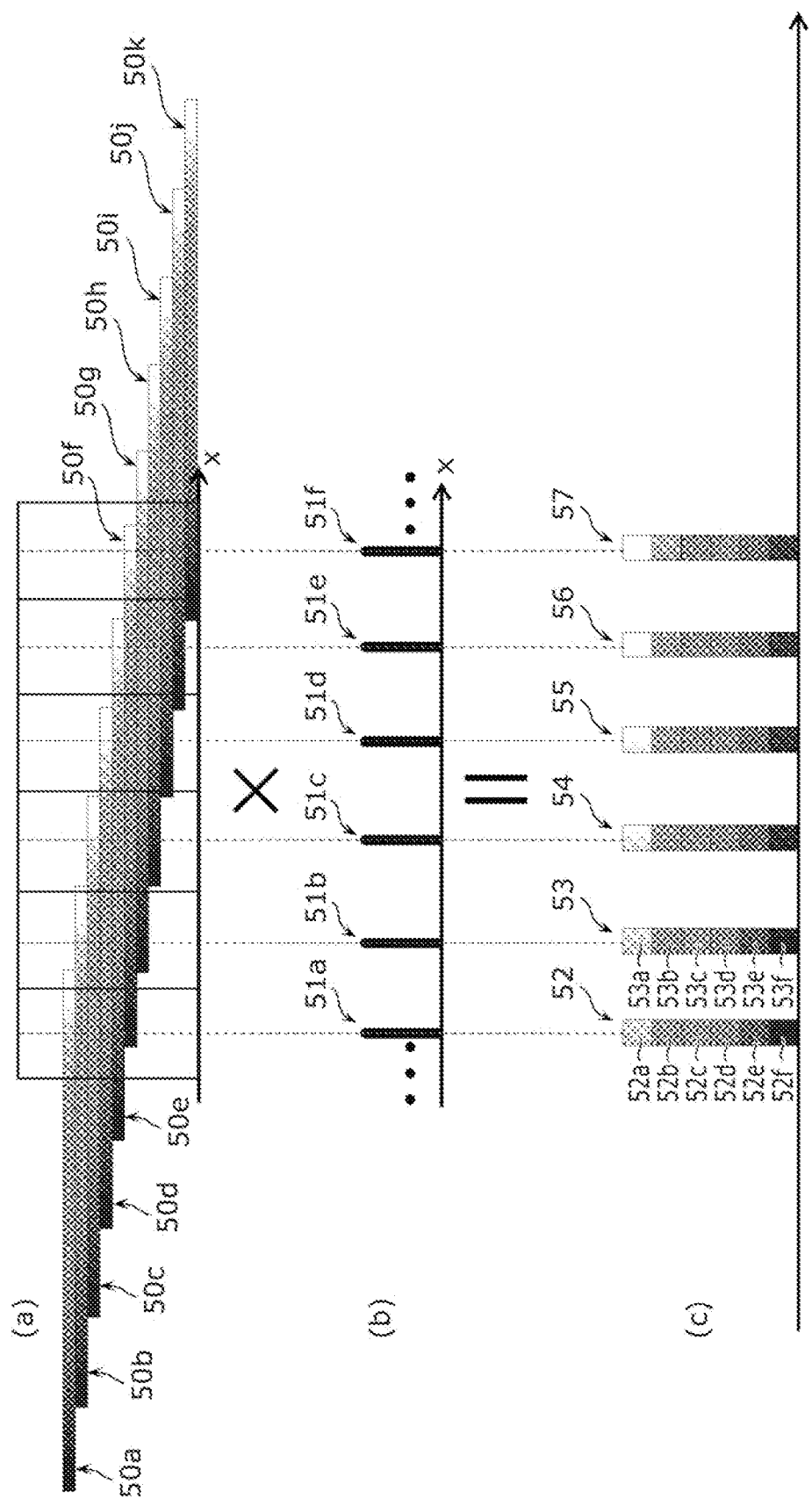

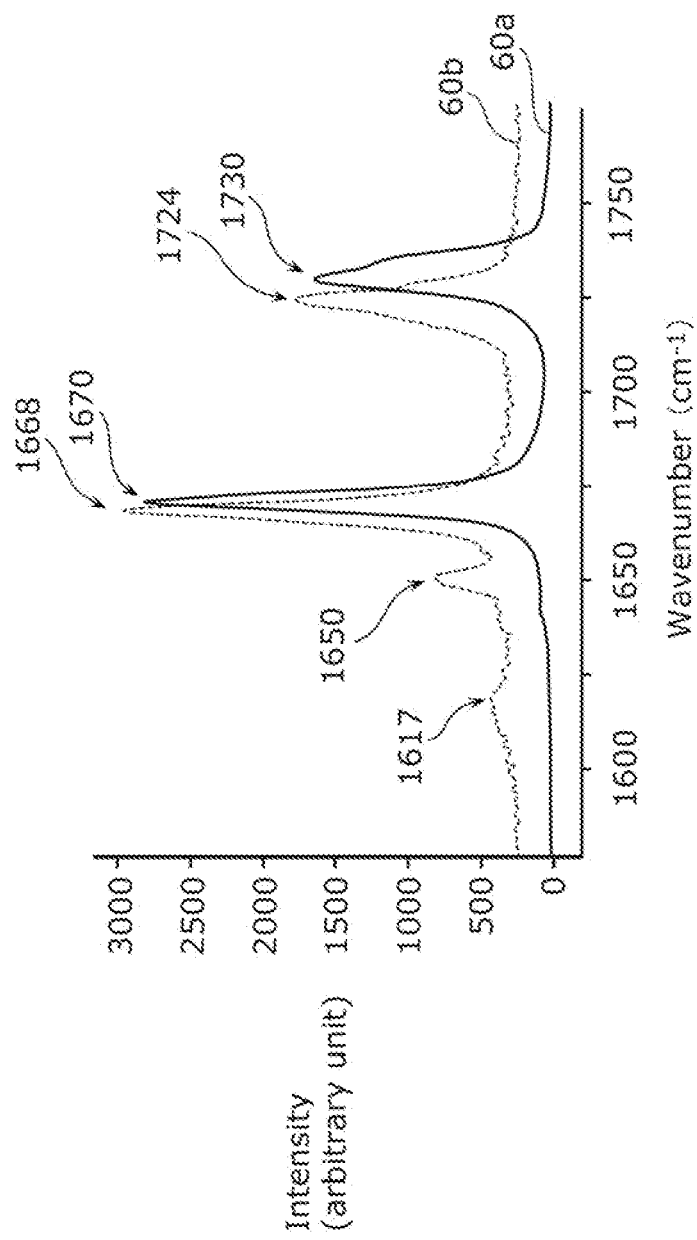

| Sample | Number of defective products detected | Detection rate |
|---|---|---|
| Contamination of 3% | 50/50 | 100% |
| Contamination of 5% | 49/50 | 98% |
| Contamination of 7% | 50/50 | 100% |
| Contamination of 10% | 50/50 | 100% |
| Contamination of 33% | 50/50 | 100% |

OPTICAL DETECTION DEVICE, OPTICAL DETECTION METHOD, METHOD FOR DESIGNING OPTICAL DETECTION DEVICE, SAMPLE CLASSIFICATION METHOD, AND DEFECT DETECTION METHOD

TECHNICAL FIELD

The present invention relates to an optical detection device that detects desired wavelength components included in input light, an optical detection method, a method for designing the optical detection device, etc.

BACKGROUND ART

A technique utilizing a Vernier effect has conventionally been proposed as an optical detection device that detects the wavelengths of input light or detects the intensities of desired wavelength components included in input light (for example, see Patent Literature (PTL) 1), The Vernier effect here is an effect that enables, with the use of both a main scale and a secondary (vernier) scale as used in a vernier caliper, the detection of a physical quantity such as the dimension of a specimen with resolution finer than the smallest scale of the main scale.

PTL 1 discloses a light wavelength detection device that detects the wavelengths of input light and includes: a dispersion device that outputs beams to locations corresponding to the wavelengths of the input light; and a detector that detects the wavelengths of the input light using, as the secondary scale for detecting the wavelengths of the input light within a wavelength range specified by the main scale, the beams that are output from the dispersion device. Accordingly, the wavelengths of the input light are detected with high resolution.

CITATION LIST

Patent Literature

[PTL 1] International Publication No. WO2014/141666

SUMMARY OF INVENTION

Technical Problem

With the light wavelength detection device according to PTL 1, however, a problem is that a wavelength range within which wavelengths are detectable is narrow due to the utilization of the principles of detecting the wavelengths of input light by expanding a wavelength range at one location in the spectrum of the input light.

In view of the above, the present invention has an objective to provide an optical detection device, an optical detection method, a method for designing an optical detection device, etc. that enable the detection of desired wavelength components included in input light across a wavelength range wider than the one conventionally used.

Solution to Problem

In order to achieve the above objective, an optical detection device according to an aspect of the present invention is an optical detection device that detects a desired wavelength component included in input light, and includes: a spectrometer that receives the input light as an input and outputs an alignment of spectra each of which is a duplication of a spectrum of the input light; a slit array including an array of three or more slits that pass light beams of wavelengths at three or more locations in the alignment of the spectra that are output from the spectrometer; and an imaging element composed of an array of pixels that receive the light beams having passed through the slit array, each of the light beams having three or more wavelength components. At least two pitches between slits are different in the array of the three or more slits.

In order to achieve the above objective, an optical detection method according to an aspect of the present invention is an optical detection method for detecting a desired wavelength component included in input light, and includes: upon receiving the input light as an input, outputting an alignment of spectra, each of which is a duplication of a spectrum of the input light; passing, by a slit array including an array of three or more slits, light beams of wavelengths at three or more locations in the alignment of the spectra that are output; and detecting, by an imaging element composed of an array of pixels, the light beams that have passed through the slit array, each of the light beams having three or more wavelength components. At least two pitches between slits are different in the array of the three or more slits.

In order to achieve the above objective, an optical detection device design method according to an aspect of the present invention is a method for designing an optical detection device that detects a desired wavelength component included in input light, and includes: a spectrometer that receives the input light as an input and outputs an alignment of spectra each of which is a duplication of a spectrum of the input light; a slit array including an array of three or more slits that pass light beams of wavelengths at three or more locations in the alignment of the spectra that are output from the spectrometer; and an imaging element composed of an array of pixels that receive the light beams having passed through the slit array, each of the light beams having three or more wavelength components. The method includes determining positions of the three or more slits in the slit array so that the three or more slits include a slit that passes a light beam of a wavelength corresponding to a location that is characteristic to the spectrum of the input light.

In order to achieve the above objective, a sample classification method according to an aspect of the present invention is a sample classification method for classifying a type of a sample, and includes: obtaining a spectrum for each of samples and determining, through compressed sensing performed on spectra obtained, three or more measurement wavelengths to be used for reconstructing the spectrum, the spectrum being a transmission spectrum or an absorption spectrum; (i) measuring, for each of samples whose types are known, wavelength components of the three or more measurement wavelengths, using the optical detection device described above, and (ii) generating reference data in which a measurement result obtained is associated with a corresponding one of the types; and (i) measuring, for a sample whose type is unknown, wavelength components of the three or more measurement wavelengths, using the optical detection device described above, and (ii) determining a type of the sample by performing matching between a measurement result obtained and the reference data.

In order to achieve the above objective, a defect detection method according to an aspect of the present invention is a defect detection method for detecting a defective sample, and includes: obtaining a spectrum for each of samples and determining, through compressed sensing performed on spectra obtained, three or more measurement wavelengths to be used for reconstructing the spectrum, the spectrum being a transmission spectrum or an absorption spectrum; (i) measuring, for each of samples that are good products, wavelength components of the three or more measurement wavelengths, using the optical detection device described above, and (ii) generating reference data indicating a measurement result obtained; and (i) measuring, for a sample that whether the sample is a good product or a defective product is unknown, wavelength components of the three or more measurement wavelengths, using the optical detection device described above, and (ii) determining whether the sample is a good product or a defective product by performing matching between a measurement result obtained and the reference data.

Advantageous Effects of Invention

The present invention provides an optical detection device, an optical detection method, a method for designing an optical detection device, etc. that enable the detection of desired wavelength components included in input light with higher wavelength resolution across a wavelength range wider than the one conventionally used.

BRIEF DESCRIPTION OF DRAWINGS

FIG. 1 is a diagram illustrating principles of detecting wavelength components according to a conventional technique.

FIG. 3 is a diagram illustrating principles of detecting wavelength components by the optical detection device according to the embodiment, FIG. 4 is a diagram illustrating an example of a spectrum of Raman scattered light which is an example of input light that is input to the optical detection device according to the embodiment.

Figure 2A:
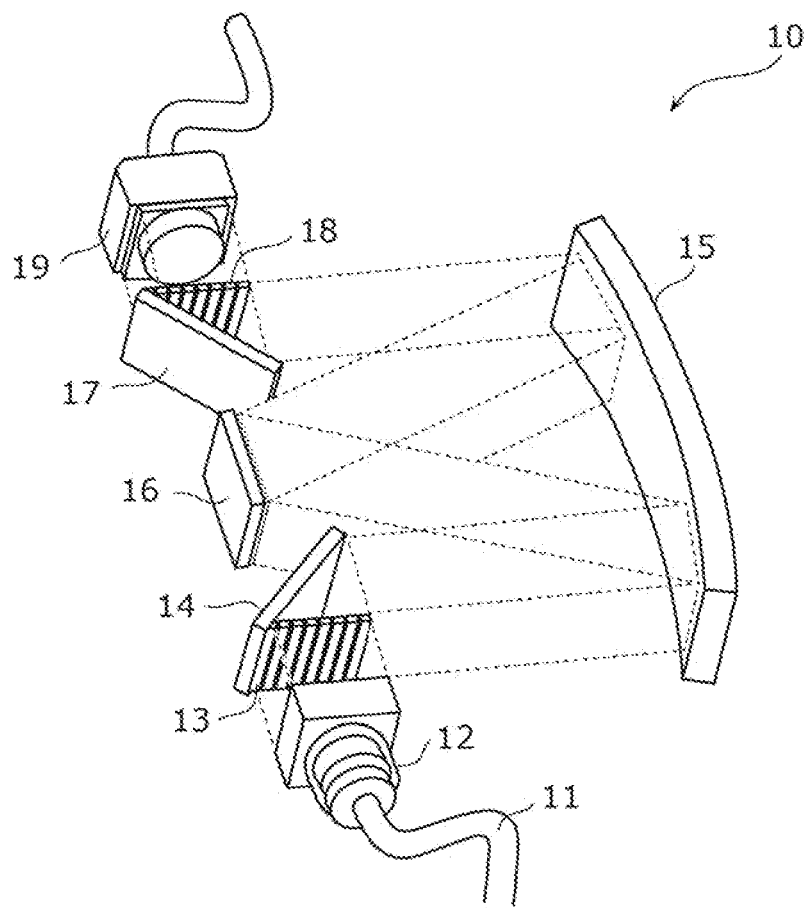
FIG. 2A is a diagram illustrating a configuration of an optical detection device according to an embodiment.

DESCRIPTION OF EMBODIMENTS (Knowledge Obtained by the Inventors)

First, a conventional technique of detecting, with high wavelength resolution, desired wavelength components included in input light, utilizing a Vernier effect will be described. FIG. 1 is a diagram illustrating principles of detecting wavelength components using the conventional technique such as the one disclosed in PTL 1.

In the conventional technique, first, with the use of a spectrometer, spectra aligned in an x-axis direction, each of which is a duplication of a spectrum of input light, are output, as illustrated in (a) in FIG. 1. Subsequently, as illustrated in (b) in FIG. 1, by using a slit array for the alignment of the spectra that are output from the spectrometer, light beams in a wavelength range resulting from displacing, little by little in the x-axis direction, each of the spectra in the alignment of the spectra illustrated in (a) in FIG. 1 pass the slit array. Note that the locations of the spectra on the x-axis direction are spatial locations and correspond also to wavelengths.

Accordingly, as illustrated in (C) in FIG. 1, a spectrum of the light that has passed through the slit array can be obtained by magnifying a single spectrum in the alignment of the spectra illustrated in (a) in FIG. 1. The magnified spectrum is detected by an imaging element composed of an array of pixels. This is attributed to the Vernier effect and the spectrum is magnified in accordance with a ratio in length between a displacement between adjacent spectra in the alignment of the spectra and the spacing of the slits composing the slit array. Owing to the Vernier effect, the imaging element detects a spectrum that is spatially more magnified than the case of detecting a single spectrum in the alignment of the spectra illustrated in (a) in FIG. 1. The spectrum is therefore detected with higher wavelength resolution. In other words, if the spacing of the slits is as wide as or wider than the resolution of the imaging element, it is possible to detect a spatially magnified spectrum for each of the slits, using different pixels. Note that it is desirable that the width of each of the slits composing the slit array be as wide as or narrower than wavelength resolution exerted by the Vernier effect.

With such a method, however, if the spatial width of a spectrum gets wider than a displacement between adjacent spectra in the alignment of the spectra, the spectra overlap each other, Therefore, when an unknown spectrum is used as input light, a problem is that a wavelength range within which wavelengths can be detected at one time is limited to at most a wavelength range equivalent to the displacement between the adjacent spectra, and thus, the wavelength range gets narrower. In other words, the problem is that the wavelength range gets narrower on the whole in exchange of wavelength resolution getting higher.

In view of the above, the inventors repeated dedicated examinations with the aim to detect, while maintaining high wavelength resolution, desired wavelength components across a wide wavelength range (e.g., a wavelength range that is wide to an extent that the spatial width of a spectrum gets wider than a displacement between adjacent spectra in the alignment of spectra), As a result, the inventors focused their attentions on the fact that when the alignment of spectra of wide range is input to a slit array, a light beam passing through each of slits includes different wavelength components separated by a fixed wavelength range (in other words, wavelengths are out of phase from each other in a fixed cycle). The inventors thus conceived an optical detection device that can detect desired wavelength components included in input light with high wavelength resolution across a wavelength range wider than the one conventionally used.

Embodiment

Hereinafter, an embodiment of the present invention will be described with reference to the drawings. Note that numerical values, shapes, materials, structural elements, the arrangement and connection of structural elements, steps, an order of the steps, etc. described in the following embodiment are mere examples, and are not intended to limit the present invention, Among structural elements described in the following embodiment, those not recited in any one of the independent claims that indicate the broadest concepts are described as optional structural elements. Moreover, the drawings are not necessarily accurate illustrations. In the drawings, substantially identical structural elements are assigned with like reference signs, and duplicated description may be omitted or simplified.

FIG. 2A is a diagram illustrating a configuration of optical detection device 10 according to the present embodiment. Optical detection device 10 includes light guide fiber 11, collimator 12, first slit array 13, first mirror 14, concave mirror 15, diffraction grating 16, second mirror 17, second slit array 18, and imaging element 19.

Light guide fiber 11 is an optical fiber that transmits input light including wavelength components of wide range, and transmits, for example, reflected light that is output from a fiber Bragg grating (FBG) or Raman scattered light obtained by a Raman spectrophotometer, to input the light to collimator 12.

Collimator 12 converts the input light from light guide fiber 11 into parallel rays.

First slit array 13 having slits aligned in parallel to each other passes, through the slits, the parallel rays that are output from collimator 12, to output separated light beams. The slits aligned in parallel are arranged at a constant pitch.

First mirror 14 reflects the light beams that are output from first slit array 13 toward concave mirror 15.

Concave mirror 15, having a concave surface that reflects light, focuses the light beams from first mirror 14 and also reflects the light beams toward diffraction grating 16.

Diffraction grating 16 performs dispersion of separating each of the light beams from concave mirror 15 according to the wavelength of the light beam, to generate a spectrum of each of the light beams (i.e., a duplication of the spectrum) and output spectra to concave mirror 15. Note that the light beams that are input from concave mirror 15 to diffraction grating 16 correspond to the array of slits included in first slit array 13. Diffraction grating 16 outputs the spectra of the light beams from concave mirror 15, which are arranged in such a manner that the location of each of the spectra is displaced by a fixed spatial distance.

Note that it can be said that a combination of first slit array 13 and diffraction grating 16 is an example of a spectrometer that receives input light as an input and outputs an alignment of spectra each of which is a duplication of the spectrum of the input light.

Second mirror 17 reflects, toward second slit array 18, the alignment of the spectra that are output from diffraction grating 16 and reflected by concave mirror 15.

Second slit array 18 is an example of a slit array that has an array of three or more slits that pass light beams of wavelengths at three or more desired locations in the alignment of the spectra from second mirror 17, The three or more slits are aligned in parallel to each other and are arranged at desired locations corresponding to the wavelengths desired to be detected with high wavelength resolution in the spectra that are input. For example, when each of the spectra that are input includes two peaks (a first peak and a second peak) desired to be detected, the three or more slits are arranged in advance so that the three or more slits include: at least one slit that passes a light beam having a desired wavelength component among the wavelength components of the first peak; and at least one slit that passes a light beam having a desired wavelength component among the wavelength components of the second peak. Accordingly, the three or more slits may be arranged at a constant pitch or may be arranged so that at least two pitches between slits are different, Note, however, that it is desirable that the spacing of the slits composing second slit array 18 be as wide as or wider than the spacing of the pixels included in imaging element 19.

Imaging element 19 is an example of an imaging element composed of an array of pixels that receive light beams, each having three or more wavelength components, which have passed through the slit array. Specifically, imaging element 19 is a solid-state imaging element such as a charge coupled device (CCD) image sensor or a complementary metal oxide semiconductor (CMOS) image sensor. Note that imaging element 19 is not limited to an image sensor and may be an array of photosensors that are separately provided.

Figure 2B:
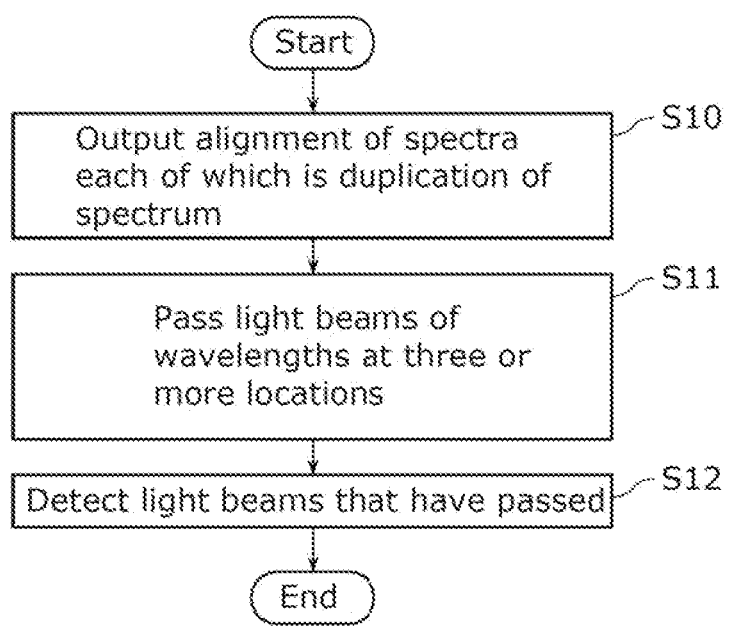
FIG. 2B is a flow chart illustrating a basic operation performed by the optical detection device according to the embodiment.

FIG. 2B is a flow chart illustrating a basic operation (i.e., an optical detection method for detecting desired wavelength components included in input light) performed by optical detection device 10 according to the present embodiment.

First, when input light is input via light conducting fiber 11, optical detection device 10 generates and outputs an alignment of spectra, each of which is a duplication of the spectrum of the input light, using collimator 12, first slit array 13, and diffraction grating 16 (dispersion step S10).

Subsequently, by passing, through second slit array 18, the light beams of wavelengths at three or more desired locations in the alignment of the spectra generated and output in dispersion step S10, optical detection device 10 selects wavelength components desired to be detected (wavelength selection step S11). Lastly, optical detection device 10 detects, using imaging element 19, the intensities of the light beams, each having three or more wavelength components, which have passed through second slit array 18 (detection step S12).

FIG. 3 is a diagram illustrating principles of detecting wavelength components by optical detection device 10 according to the present embodiment. (a) in FIG. 3 shows an alignment of spectra 50a to 50k that are output from diffraction grating 16 and input to second slit array 18 via concave mirror 15 and second mirror 17. In the present embodiment, since the input light is a signal of wide range, spectra 50a to 50k that are input to second slit array 18 are each arranged with a displacement in the x-axis direction in a state in which parts of wavelength components spatially overlap each other, as illustrated in the diagram which is different from FIG. 1 illustrating the detection principles according to the conventional technique. Note that in (a) in FIG. 3, a frame (the solid line frame which is divided into six sections) indicating the size (i.e., resolution) of pixels (six pixels here) included in imaging element 19 is also shown. In (a) in FIG. 3, spectra 50a to 50k are arranged in a direction orthogonal to the x-axis direction with each of spectra 50a to 50k being displaced, but this is not necessarily required. Spectra 50a to 50k may be aligned in the direction orthogonal to the x-axis direction without any displacement.

(b) in FIG. 3 illustrates an example of an arrangement of slits 51a to 51f included in second slit array 18, For the sake of easy comprehension, (b) in FIG. 3 shows an example in which slits 51a to 51f are arranged to pass light beams in a wavelength range resulting from displacing, little by little in the x-axis direction, each of the spectra in the alignment of spectra 50a to 50k illustrated in (a) in FIG. 3.

(c) in FIG. 3 is a diagram illustrating the wavelength components of each of light beams 52 to 57 (i.e., light beams detected by the six pixels composing imaging element 19, as illustrated in (a) in FIG. 3) that have passed through slits 51a to 51f included in second slit array 18. As illustrated in the diagram, each of light beams 52 to 57 having passed through slits 51a to 51f does not include only a single wavelength component, but includes wavelength components which correspond to the same position on the x-axis in spectra 50a to 50k illustrated in (a) in FIG. 3, which is different from FIG. 1 illustrating the detection principles according to the conventional technique.

Specifically, light beam 52 having passed through slit 51a includes six wavelength components 52a to 52f, as illustrated in (c) in FIG. 3. Wavelength component 52a is a wavelength component of spectrum 50a corresponding to the location of slit 51a, wavelength component 52b is a wavelength component of spectrum 50b corresponding to the location of slit 51a, wavelength component 52c is a wavelength component of spectrum 50c corresponding to the location of slit 51a (hereinafter, like description is omitted), and wavelength component 52f is a wavelength component of spectrum 50f corresponding to the location of slit 51a.

Likewise, light beam 53 having passed through slit 51b includes six wavelength components 53a to 53f. Wavelength component 53a is a wavelength component of spectrum 50b corresponding to the location of slit 51b, wavelength component 53b is a wavelength component of spectrum 50c corresponding to the location of slit 51b, wavelength component 53c is a wavelength component of spectrum 50d corresponding to the location of slit 51b (hereinafter, like description is omitted), and wavelength component 53f is a wavelength component of spectrum 50g corresponding to the location of slit 51b. Similarly, each of light beams 54 to 57 respectively having passed through slits 51c to 51f includes wavelength components of different six spectra which correspond to the corresponding one of the locations of slits 51c to 51f.

Assuming herein, for example, that input light includes a wavelength component in the vicinity of 1500 nm, and diffraction grating 16 outputs an alignment of spectra obtained by dispersing the wavelength component in the vicinity of 1500 nm. Moreover, the positional displacement in the x-axis direction in the alignment of spectra 50a to 50k illustrated in (a) in FIG. 3 is equivalent to 1.5 nm. Furthermore, slits 51a to 51f illustrated in (b) in FIG. 3 are each arranged with the displacement of 0.1 nm in the x-axis direction with respect to the corresponding spectrum (i.e., the spacing of slits 51a to 51f is 1.6 nm). Such a positional displacement in the x-axis direction is made to exert the Vernier effect.

Accordingly, among the light beams illustrated in (c) in FIG. 3, light beam 52 includes wavelength components 52a to 52f resulting from a displacement in terms of wavelength cycle of 1.5 nm as in 1500 nm (52f), 1501.5 nm (52e), 1503 nm (52d), 1504.5 nm (52c), 1506 (52b), and 1507.5 nm (52a). Likewise, light beam 53 includes wavelength components 53a to 53f each being greater, by 0.1 nm, than the corresponding one of the wavelength components included in light beam 52 adjacent to the left of light beam 53 as in 1500.1 nm (53f), 1501.6 (53e), 1503.1 nm (53d), 1504.6 nm (53c), 1506.1 nm (53b), and 1507.6 nm (53a). Thus, the wavelength components of each of light beams 52 to 57 having passed through second slit array 18 are separated by wavelength resolution as high as 0.1 nm. At the same time, the wavelength components separated by a wavelength range as wide as the integer multiple of 1.5 nm are simultaneously observed.

The following describes a specific example of a configuration of optical detection device 10 according to the present embodiment which uses the detection principles described above, FIG. 4 is a diagram illustrating an example of a spectrum of Raman scattered light which is an example of input light to be input to optical detection device 10 according to the present embodiment. The diagram illustrates an example of Raman scattered light spectrum 60a (in the solid line) obtained from a first sample to be identified and an example of Raman scattered light spectrum 60b (in the dotted line) obtained from a second sample that is similar to but different from the first sample. Considered herein is the case where Raman scattered light obtained from the first sample is the input light. The input light has a spectrum having peaks, one in the vicinity of 1670 cm$^{-1}$ and the other in the vicinity of 1730 cm$^{-1}$ in terms of wavenumber (see Raman scattered light spectrum 60a). The following describes an example of detecting, with wavelength resolution as high as 0.1 cm$^{-1}$ in terms of wavenumber, a wavelength component for each of two peaks separated by a wavelength range as wide as 60 cm$^{-1}$ in terms of wavenumber.

Figure 5:
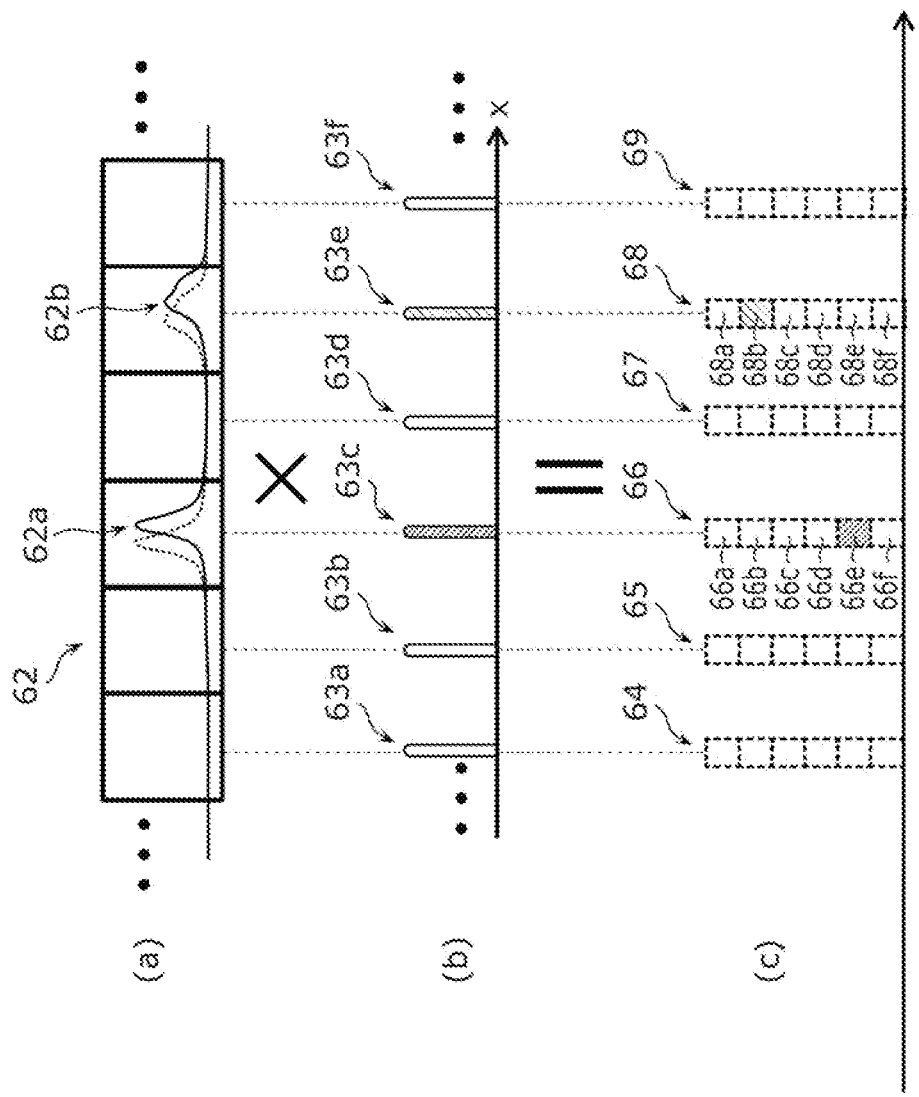
FIG. 5 is a diagram illustrating principles of detecting, with high wavelength resolution by the optical detection device according to the embodiment, a wavelength component for each of two peaks included in the input light illustrated in FIG. 4, and an example of a configuration of the optical detection device.

FIG. 5 is a diagram illustrating principles of detecting, with high wavelength resolution, a wavelength component for each of two peaks included in the input light illustrated in FIG. 4, using optical detection device 10 according to the present embodiment, and an example of a configuration of optical detection device 10. (a) in FIG. 5 illustrates examples of spectra that are output from diffraction grating 16 and input to second slit array 18 via concave mirror 15 and second mirror 17 (here, only spectrum 62 that is one of the spectra is shown in the diagram). Note that for spectrum 62, Raman scattered light spectrum 60a of the first sample is shown in a solid line and Raman scattered light spectrum 60b of the second sample is shown in a dotted line for reference. The frame (the solid line frame divided into six sections) in (a) in FIG. 5 shows the size (i.e., resolution) of pixels (six pixels here) composing imaging element 19.

Two peaks 62a and 62b shown in the diagram respectively correspond to a peak whose wavenumber is in the vicinity of 1670 cm$^{-1}$ and a peak whose wavenumber is in the vicinity of 1730 cm$^{-1}$. Actually, an alignment of spectra (each of which is a duplication of a spectrum) is input to second slit array 18. The pitch of the slits in first slit array 13 is designed in advance so that each of the spectra is arranged with the displacement, in the x-axis direction, of 5 cm$^{-1}$ when calculated in terms of wavenumber (this is equivalent to, for example, the resolution of imaging element 19).

(b) in FIG. 5 illustrates an example of an arrangement of slits 63a to 63f included in second slit array 18. The diagram shows an example in which, for instance, slits 63a to 63f are arranged at locations corresponding to wavelengths desired to be detected in spectrum 62 illustrated in (a) in FIG. 5. Specifically, among slits 63a to 63f illustrated in the diagram, slit 63c, for example, is set at the location where a wavenumber in spectrum 62 illustrated in (a) in FIG. 5 corresponds to a location in the vicinity of 1670 cm$^{-1}$ (i.e., first peak 62a), and slit 63e is set at the location where a wavenumber in spectrum 62 corresponds to a location in the vicinity of 1730 cm$^{-1}$ (i.e., second peak 62b). Note that the width of each of slits 63a to 63f per se is designed in advance to indicate a value corresponding to wavelength resolution exerted by the Vernier effect (here, a value equivalent to 0.1 cm$^{-1}$ in terms of wavenumber). Note, however, that the width of each of slits 63a to 63f per se is not limited to a value corresponding to wavelength resolution exerted by the Vernier effect, and may be a value smaller or larger than the value corresponding to the wavelength resolution exerted by the Vernier effect, or some slits may each have a value smaller than the value corresponding to the wavelength resolution exerted by the Vernier effect while the other slits may each have a value larger than the value corresponding to the wavelength resolution exerted by the Vernier effect, in accordance with the wavelength range of a light beam desired to pass through each of the slits.

(c) in FIG. 5 is a diagram illustrating the wavelength components of each of light beams 64 to 69 that have passed through slits 63a to 63f included in second slit array 18 (i.e., light beams to be detected by imaging element 19), Focusing on light beam 66, light beam 66 includes wavelength components that are out of phase from each other by the wavenumber cycle of 5 cm$^{-1}$ (each being a component in terms of range width equivalent to 0.1 cm$^{-1}$ in terms of wavenumber) as in wavelength component 66a with the wavenumber of 1650 cm$^{-1}$, wavelength component 66b with the wavenumber of 1655 cm$^{-1}$, wavelength component 66c with the wavenumber of 1660 cm$^{-1}$, wavelength component 66d with the wavenumber of 1665 cm$^{-1}$, wavelength component 66e with the wavenumber of 1670 cm$^{-1}$, and wavelength component 66f with the wavenumber of 1675 cm$^{-1}$. However, among wavelength components 66a to 66f included in light beam 66, the amount of each of the wavelength components other than wavelength component 66e with the wavenumber of 1670 cm$^{-1}$ is relatively small, as can be seen from the spectrum of the input light illustrated in FIG. 4. Accordingly, light beam 66 substantially includes only wavelength component 66e with the wavenumber of 1670 cm$^{-1}$. As a result, the intensity of the light indicated by the pixels in imaging element 19 that have received light beam 66 substantially indicates only the intensity of wavelength component 66e with the wavenumber 1670 cm$^{-1}$, that is, the intensity at the center position of first peak 62a (i.e., a component in terms of range width of 0.1 cm$^{-1}$ in 1670 cm$^{-1}$ in terms of wavenumber).

Likewise, focusing on light beam 68, light beam 68 includes wavelength components that are out of phase from each other by the wavenumber cycle of 5 cm$^{-1}$ (each being a component in terms of range width equivalent to 0.1 cm$^{-1}$ in terms of wavenumber) as in wavelength component 68a with the wavenumber of 1725 cm$^{-1}$, wavelength component 68b with the wavenumber of 1730 cm$^{-1}$, wavelength component 68c with the wavenumber of 1735 cm$^{-1}$, wavelength component 68d with the wavenumber of 1740 cm$^{-1}$, wavelength component 68e with the wavenumber of 1745 cm$^{-1}$, and wavelength component 68f with the wavenumber of 1750 cm$^{-1}$. However, among the wavelength components included in light beam 68, the amount of each of the wavelength components other than wavelength component 68b with the wavenumber of 1730 cm$^{-1}$ is relatively small, as can be seen from the spectrum of the input light illustrated in FIG. 4. Accordingly, light beam 68 substantially includes only wavelength 68b with the wavenumber of 1730 cm$^{-1}$, As a result, the intensity of the light indicated by the pixels in imaging element 19 that have received light beam 68 substantially indicates only the intensity of wavelength component 68b with the wavenumber 1730 cm$^{-1}$, that is, the intensity at the center position of second peak 62b (i.e., a component in terms of range width of 0.1 cm$^{-1}$ in 1730 cm$^{-1}$ in terms of wavenumber).

Accordingly, optical detection device 10 having a configuration of the type exemplified with reference to FIG. 5 is capable of detecting, with wavelength resolution as high as the range width of 0.1 cm$^{-1}$, wavelength components at two peaks separated by a wavelength range as wide as 60 cm$^{-1}$ in input light (i.e., Raman scattered light) having peaks, one in the vicinity of 1670 cm$^{-1}$ and the other in the vicinity of 1730 cm$^{-1}$ in terms of wavenumber.

Considered herein is the case of detecting, using such optical detection device 10, Raman scattered light spectrum 60b obtained from the second sample illustrated in FIG. 4. Raman scattered light spectrum 60b of the second sample illustrated in FIG. 4 is similar to Raman scattered light spectrum 60a obtained from the first sample, but the positions of peaks are slightly displaced in the direction toward lower wavenumbers (see the dotted spectrum in (a) in FIG. 5). When optical detection device 10 performs detection using such Raman scattered light as input light, the wavelength component of 1670 cm$^{-1}$ included in light beam 66 in (c) in FIG. 5 greatly decreases due to the displacement of the peak positions, as compared to the case of using Raman scattered light spectrum 60a of the first sample. Similarly, the wavelength component of 1730 cm$^{-1}$ included in light beam 68 in (c) in FIG. 5 greatly decreases compared to the case of using Raman scattered light spectrum 60a of the first sample, Thus, by using such optical detection device 10, it is possible to discriminate spectrum 60a from spectrum 60b illustrated in FIG. 4, thereby identifying the first sample and the second sample.

Optical detection device 10 according to the present embodiment thus detects a wavelength signal of wide range with high wavelength resolution by utilizing the cyclicity of a vernier-scaled component in an output wavelength, which owes to the Vernier effect. Note that in the example illustrated in (b) in FIG. 5, a single slit is set in second slit array 18 for each of desired two wavelength peaks 62a and 62b across a wide wavelength range. In this case, since the number or locations of the other slits may be any number or any locations, at least two pitches between slits may be different in the array of three or more slits included in second slit array 18.

Note that in the example illustrated in (b) in FIG. 5, a single slit is set in second slit array 18 for each of two peaks 62a and 62b included in a single spectrum illustrated in (a) in FIG. 5. However, plural slits, instead of only one slit, may be provided for a single peak desired to be detected. In other words, the wavelength components of wavelengths at two or more locations may be detected for a single peak desired to be detected.

Figure 6:
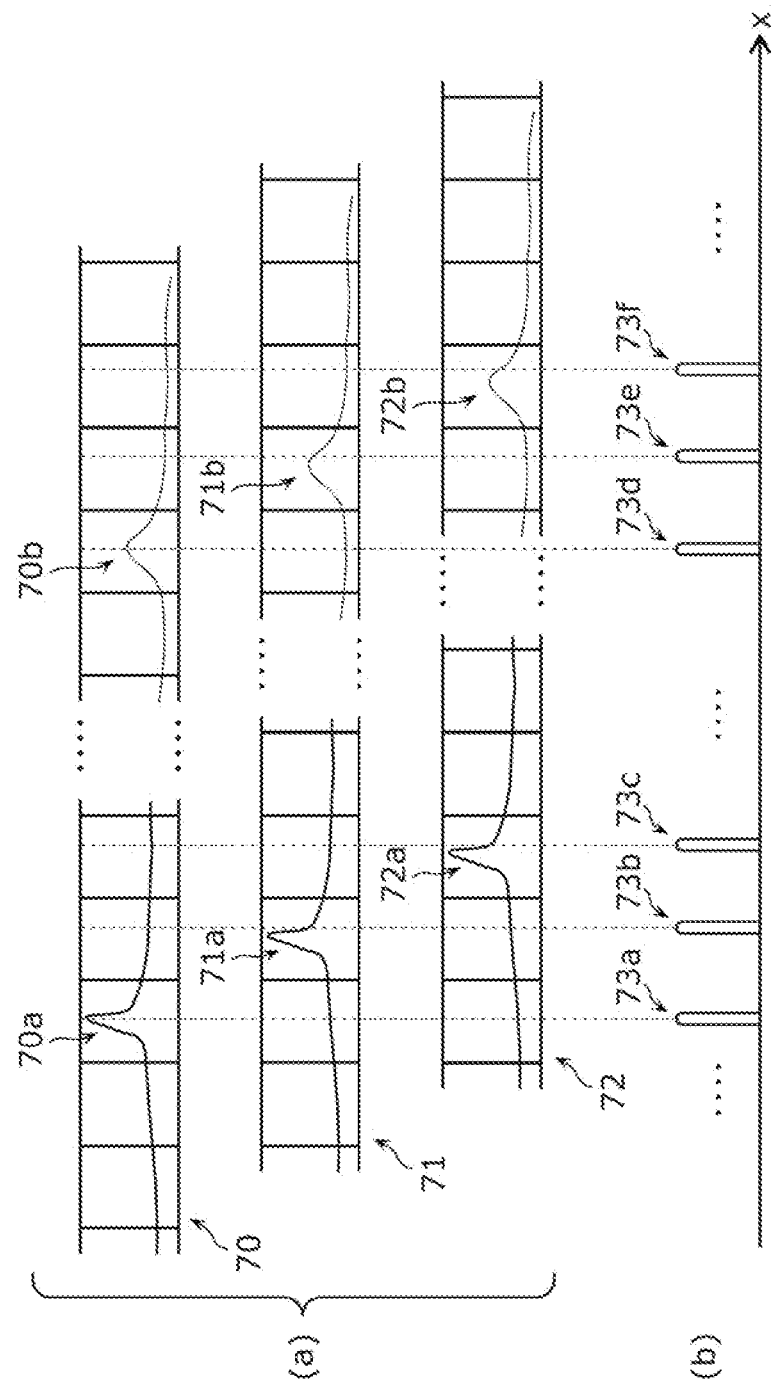
FIG. 6 is a diagram illustrating principles of detecting wavelength components at two or more locations for a single peak desired to be detected, using the optical detection device according to the embodiment, and an example of a configuration of the optical detection device.

FIG. 6 is a diagram illustrating principles of detecting the wavelength components of wavelengths at two or more locations for a single peak desired to be detected, using optical detection device 10 according to the present embodiment, and an example of a configuration of optical detection device 10.

(a) in FIG. 6 illustrates an example of plural (three in this case) spectra 70 to 72 that are output from diffraction grating 16 and input to second slit array 18 via concave mirror 15 and second mirror 17. Two peaks of 70a and 70b, 71a and 71b, and 72a and 72b in respective spectra 70, 71, and 72 are, for example, a peak whose wavenumber is in the vicinity of 1670 cm$^{-1}$ and a peak whose wavenumber is in the vicinity of 1730 cm$^{-1}$, respectively. The pitch of the slits included in first slit array 13 is designed in advance so that each of the spectra in the alignment is arranged with the displacement, in the x-axis direction, of 5 cm$^{-1}$ when calculated in terms of wavenumber.

(b) in FIG. 6 illustrates an example of an arrangement of slits 73a to 73f included in second slit array 18. In the diagram, slit 73a is set at the location corresponding to 1670 cm$^{1}$ in spectrum 70 illustrated in (a) in FIG. 6, slit 73b is set at the location corresponding to 1670.1 cm$^{-1}$ in spectrum 71 illustrated in (a) in FIG. 6, slit 73c is set at the location corresponding to 1670.2 cm$^{-1}$ in spectrum 72 illustrated in (a) in FIG. 6, slit 73d is set at the location corresponding to 1730 cm$^{-1}$ in spectrum 70 illustrated in (a) in FIG. 6, slit 73e is set at the location corresponding to 1730.1 cm$^{-1}$ in spectrum 71 illustrated in (a) in FIG. 6, and slit 73f is set at the location corresponding to 1730.2 cm$^{-1}$ in spectrum 72 illustrated in (a) in FIG. 6. Thus, among slits 73a to 73f included in second slit array 18, three slits 73a to 73c that are set on the left are each displaced, in the x-axis direction, by 0.1 cm$^{-1}$ when calculated in terms of wavenumber at a location corresponding to a wavenumber in the vicinity of 1670 cm$^{-1}$ in the corresponding spectrum. On the other hand, three slits 73d to 73f that are set on the right are each displaced, in the x-axis direction, by 0.1 cm$^{-1}$ when calculated in terms of wavenumber at a location corresponding to a wavenumber in the vicinity of 1730 cm$^{-1}$ in the corresponding spectrum.

Light beams having passed through such second slit array 18 substantially include the following wavelength components, as described with reference to FIG. 5, In other words, light beams, having passed through three slits 73a, 73b, and 73c that are set on the left among six slits 73a to 73f illustrated in (b) in FIG. 6, exhibit the intensities of a wavelength component with the wavenumber of 1670 cm$^{-1}$, a wavelength component with the wavenumber of 1670.1 cm$^{-1}$, and a wavelength component with the wavenumber of 1670.2 cm$^{-1}$, respectively, that is, the intensities in the vicinity of the center of the first peak. Moreover, light beams having passed through three slits 73d, 73e, and 73f that are set on the right exhibit the intensities of a wavelength component with the wavenumber of 1730 cm$^{1}$, a wavelength component with the wavenumber of 1730.1 cm$^{-1}$, and a wavelength component with the wavenumber of 1730.2 cm$^{-1}$, respectively, that is, the intensities in the vicinity of the center of the second peak.

Accordingly, optical detection device 10 having a configuration of the type exemplified with reference to FIG. 5 is capable of detecting, with wavelength resolution as high as OA cm$^{-1}$, wavelength components for each of two peaks separated by a wavelength range as wide as 60 cm$^{-1}$ in input light (i.e., Raman scattered light) having one peak in the vicinity of 1670 cm$^{-1}$ and the other peak in the vicinity of 1730 cm$^{-1}$ in terms of wavenumber.

Note that it is desirable to contrive a way to prevent pixels in imaging element 19 which detect the light beams having passed through slits 73a to 73c from being excessively separated from pixels in imaging element 19 which detect the light beams having passed through slits 73d to 73f. For this, it is advised to bring the positions of these slits in second slit array 18 closer to each other or to design an optical path in advance using concave mirror 15 and second mirror 17 so that these light beams are in proximity to each other when incident on imaging element 19. In the case of detecting peaks at wavelengths that are in proximity to each another, on the other hand, it is advised to do the contrary.

The present invention can be implemented as a method for designing optical detection device 10. In other words, the present invention is a method for designing an optical detection device that detects desired wavelength components included in input light, and may include a step of determining, for a spectrum that is known to include a first peak and a second peak, the positions of three or more slits included in second slit array 18 in such a manner that the three or more slits include a slit that passes a light beam of a wavelength corresponding to the first peak and a slit that passes a light beam of a wavelength corresponding to the second peak. This achieves a method for designing an optical detection device capable of detecting desired wavelength components included in input light with high wavelength resolution across a wavelength range wider than the one conventionally used.

The following describes an example in which optical detection device 10 according to the present embodiment is applied to a core engine (a spectrometer) used in an interrogator in optical fiber sensing.

Figure 7:
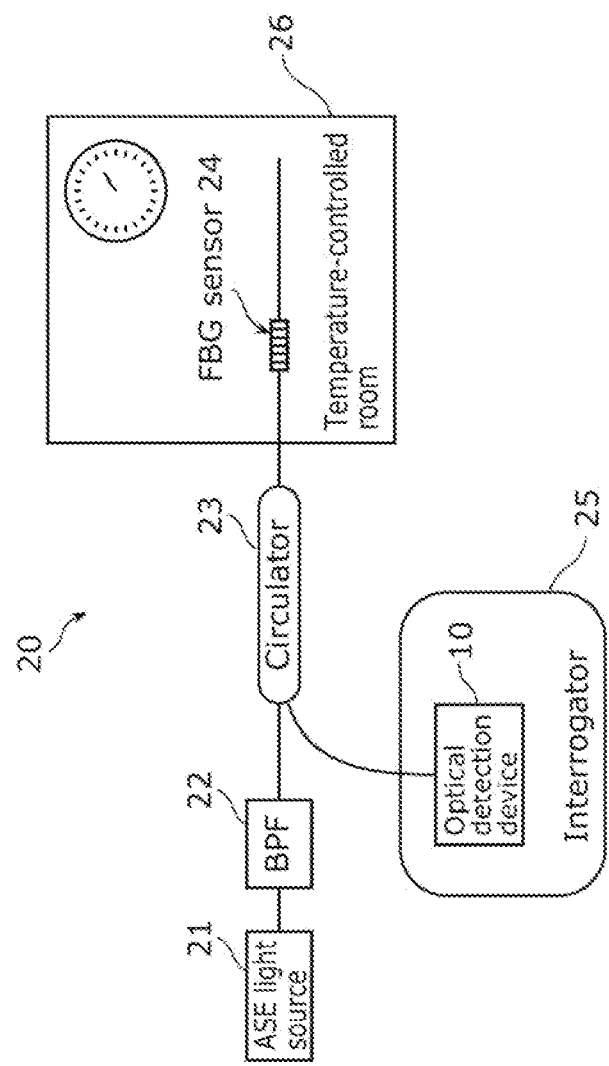
FIG. 7 is a block diagram illustrating an example of a configuration of an optical fiber sensing system that uses the optical detection device according to the embodiment.

FIG. 7 is a block diagram illustrating an example of a configuration of optical fiber sensing system 20 that uses optical detection device 10 according to the present embodiment. Light emitted from amplified spontaneous emission (ASE) light source 21 is input to band-pass filter 22 via an optical fiber, and only light in a range necessary for detection is output from band-pass filter 22 and input to FBG sensor 24 via circulator 23. FBG sensor 24 is placed in temperature-controlled room 26 in which a temperature can be controlled. Reflected light from FBG sensor 24 is input, via circulator 23, to optical detection device 10 which is a core engine inside interrogator 25 that measures the wavelength of light.

Figure 8:
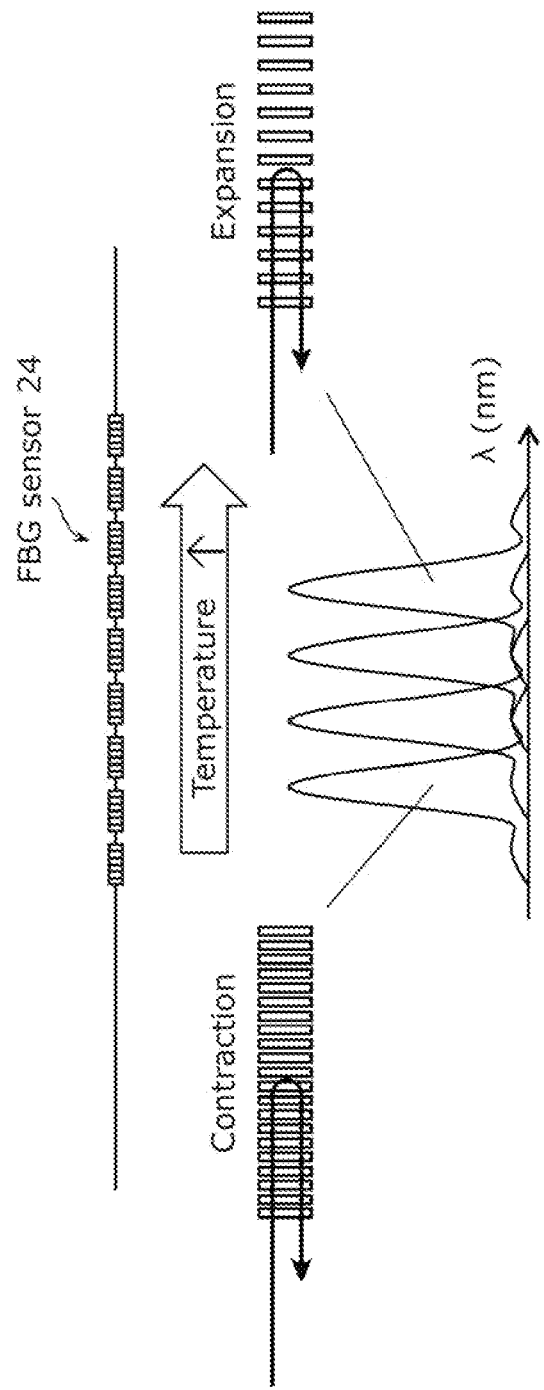
FIG. 8 is a diagram illustrating the principles of an FBG sensor in FIG. 7.

FIG. 8 is a diagram illustrating the principles of FBG sensor 24 in FIG. 7. FBG sensor 24 includes diffraction gratings in an optical fiber. When input light with a range passes through FBG sensor 24, a specific wavelength component referred to as a Bragg wavelength is reflected by FBG sensor 24 and the other wavelengths transmit. If the temperature in a room in which FBG sensor 24 is placed changes, the optical fiber contracts or expands, Due to the contraction or expansion, the spacing of FBG sensors 24 (the spacing of the diffraction gratings) also changes and the reflected Bragg wavelength changes as well. With such FBG sensor 24, when the temperature increases by 10 degrees Celsius, the spectrum of reflected light shifts toward the lower direction by the wavelength of 0.1 nm.

Figure 9:
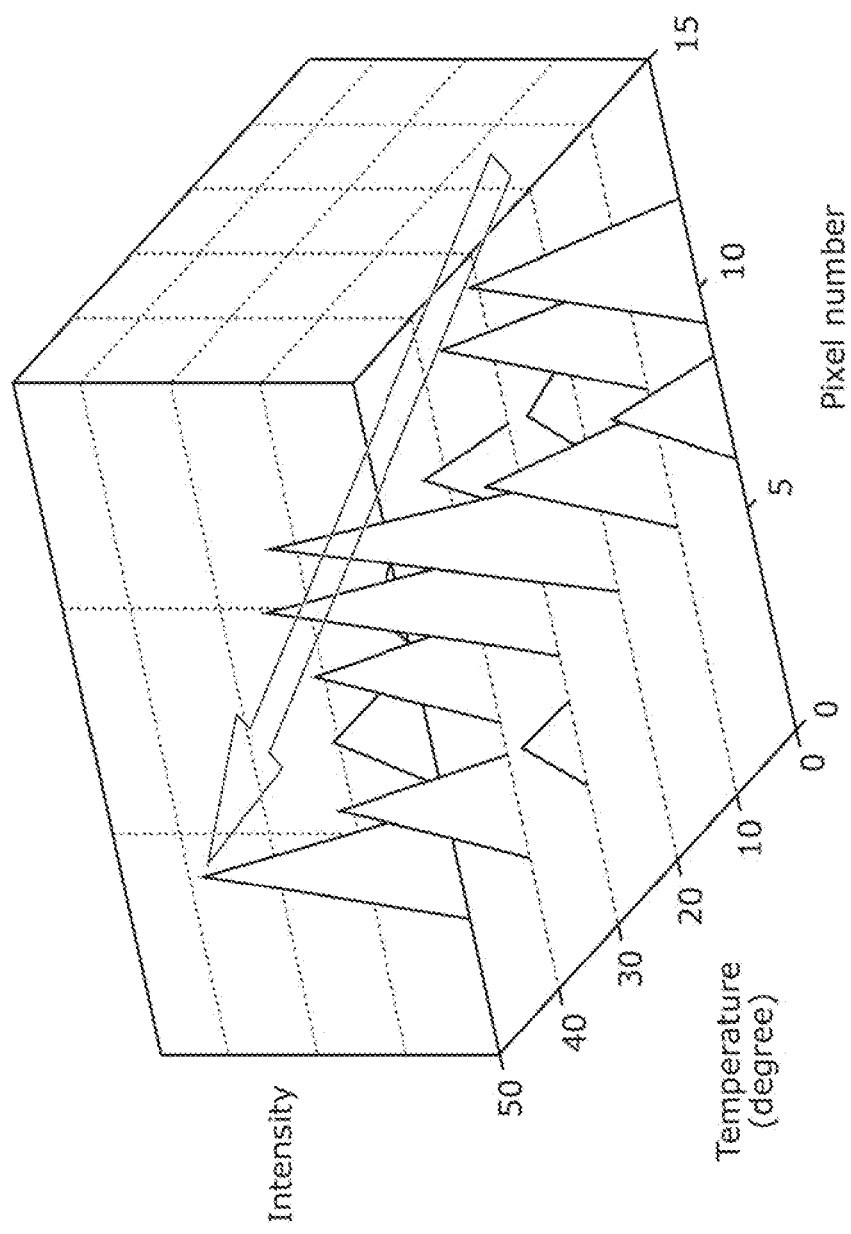
FIG. 9 is a three-dimensional diagram illustrating an example of a measurement result obtained by the optical detection device in the optical fiber sensing system illustrated in FIG. 7.

FIG. 9 is a three-dimensional diagram illustrating an example of a measurement result obtained by optical detection device 10 in optical fiber sensing system 20 illustrated in FIG. 7. The horizontal axis indicates a number assigned to each of the pixels included in imaging element 19 in optical detection device 10, the vertical axis indicates the temperature of FBG sensor 24 achieved in temperature-controlled room 26, and the height axis indicates the intensity of a wavelength component detected by each of the pixels. The diagram illustrates a change in the intensity detected by each of the pixels included in imaging element 19 in optical detection device 10 in an experiment in which the temperature of FBG sensor 24 is changed by 10 degrees Celsius in temperature-controlled room 26.

Note that optical detection device 10 has, for example, the same configuration as that described with reference to FIG. 6. In other words, optical detection device 10 detects, with the wavelength resolution of 0.1 nm, the locations of wavelengths for each of peaks included in input light.

As can be seen from FIG. 9, optical detection device 10 is capable of clearly discerning that the locations of the peaks shift in accordance with a temperature change by 10 degrees Celsius.

The following describes examples of an experiment in which an analysis (type discrimination or defect detection) on olive oils is conducted using optical detection device 10 according to the present embodiment.

In order to analyze a sample using optical detection device 10, it is important to determine which wavelength components in input light are to be detected, Therefore, a method for designing a method for manufacturing) optical detection device 10 suitable for a sample analysis will be firstly described.

Figure 10:
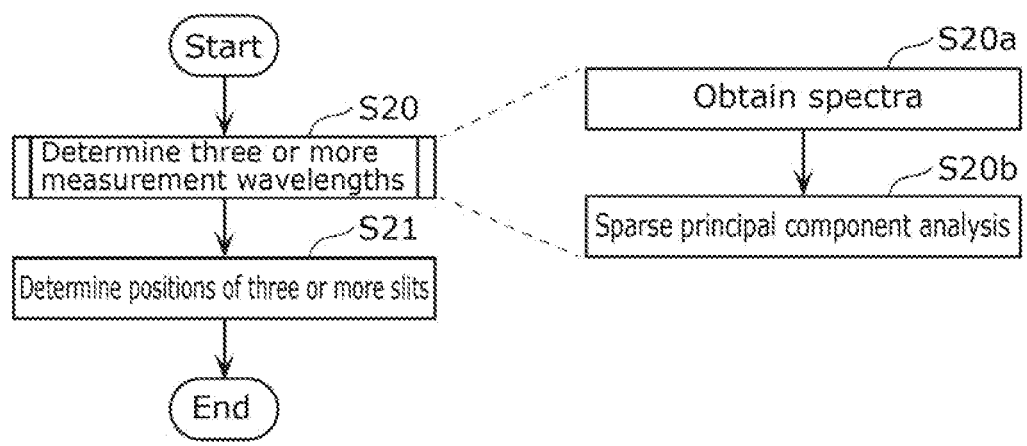
FIG. 10 is a flow chart illustrating a method for designing an optical detection device for use in experiments.

FIG. 10 is a flow chart illustrating a method for designing optical detection device 10 for use in experiments. The flow chart shows a procedure of determining the wavelengths of input light to which three or more slits in second slit array 18 are to be corresponded.

First, three or more measurement wavelengths suitable for an analysis on samples (olive oils in this case) are determined (measurement wavelength determination step S20). Subsequently, the positions of the three or more slits in second slit array 18 are determined so that the three or more slits include slits each of which passes a light beam of a different one of the three or more measurement wavelengths determined in measurement wavelength determination step S20 (position determination step S21).

More specifically, in measurement wavelength determination step S20, a spectrum (a transmission spectrum in this case) is obtained for each of the samples (olive oils in this case) (S20a), and a sparse principal component analysis is performed on obtained spectra to specify three or more measurement wavelengths (S20b), In other words, three or more measurement wavelengths suitable for reconstructing the spectrum are determined through compressed sensing. Note that the sparse principal component analysis is a principal component analysis which is one of the statistical data analyses for dimensional compression, and is an analysis method of performing estimation (i.e., sparse estimation) so that as many principal components as possible indicate 0.

Figure 11:
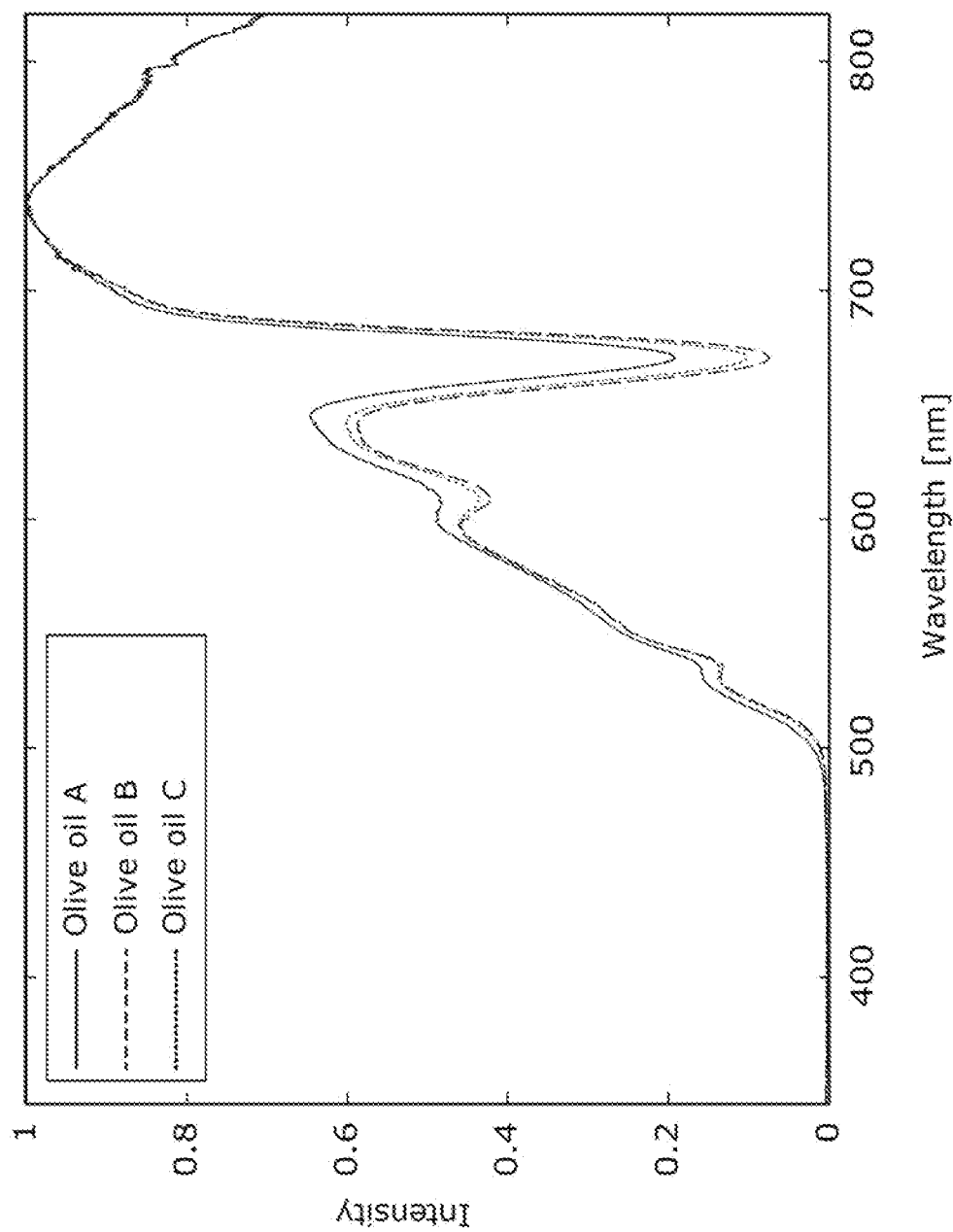
FIG. 11 is a diagram illustrating an example of a transmission spectrum of each of olive oils used for a sparse principal component analysis illustrated in FIG. 10.

FIG. 11 is a diagram illustrating an example of the transmission spectrum of each of the olive oils used for the sparse principal component analysis illustrated in FIG. 10. The diagram illustrates transmission spectra (one in the solid line another in the broken line, and the other in the dotted line) of three types of olive oils (A, B, and C), Each of the transmission spectra includes 1000 points of measurement data (1000 wavelength components).

Figure 12:
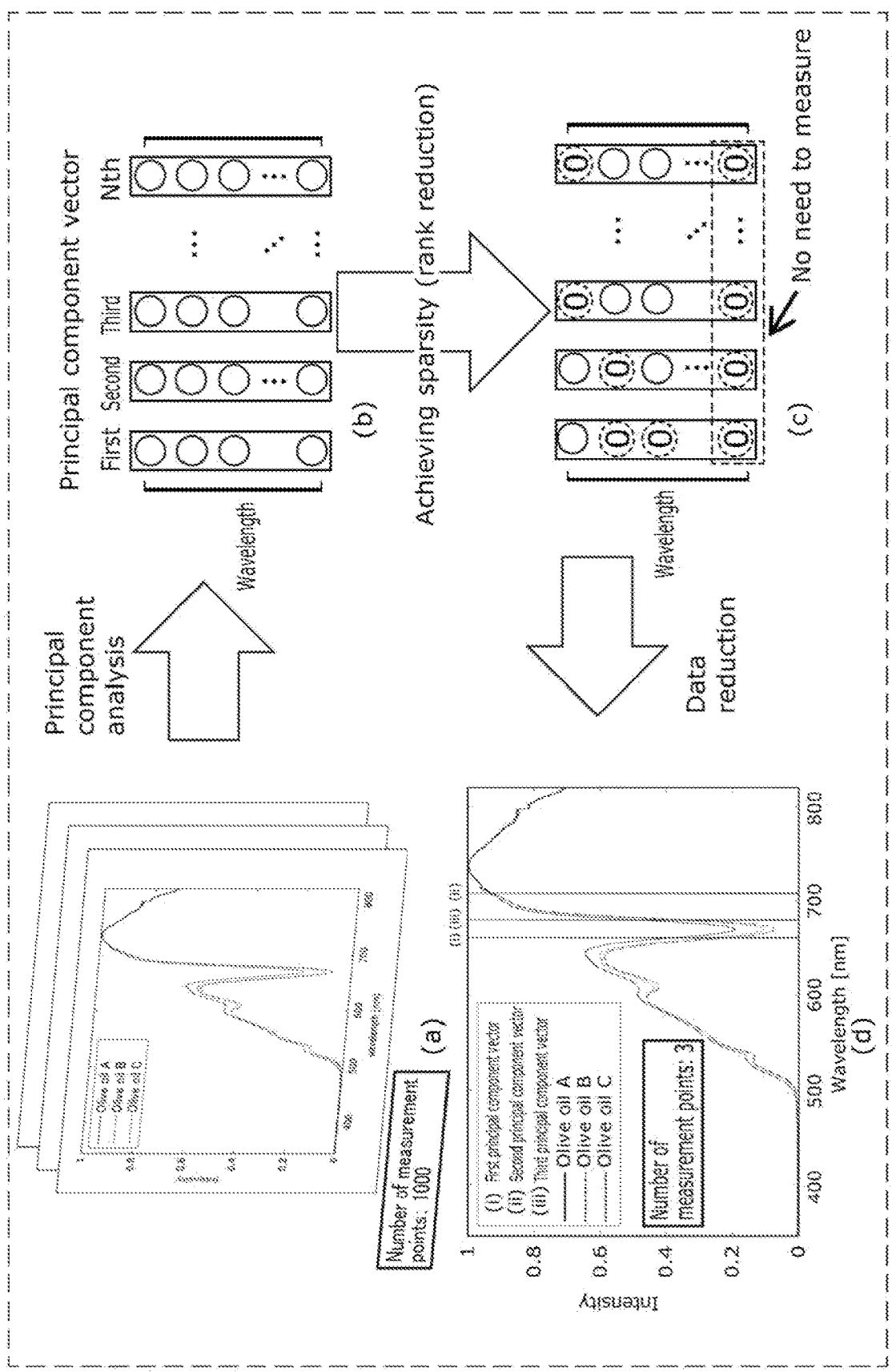
FIG. 12 is a diagram illustrating an overall process of the sparse principal component analysis illustrated in FIG. 10.

FIG. 12 is a diagram illustrating an overall process of the sparce principal component analysis illustrated in FIG. 10. The diagram shows the following: principal components (each being a vector having a wavelength component as an element) are generated from the transmission spectra ((a) in FIG. 12) of the three types of olive oils (A, B, and C) ((b) in FIG. 12); the number of wavelength components that require measurement is reduced through sparse estimation ((c) in FIG. 12); and as a result, the number of measurement wavelengths is narrowed down to three ((d) in FIG. 12).

Figure 13:
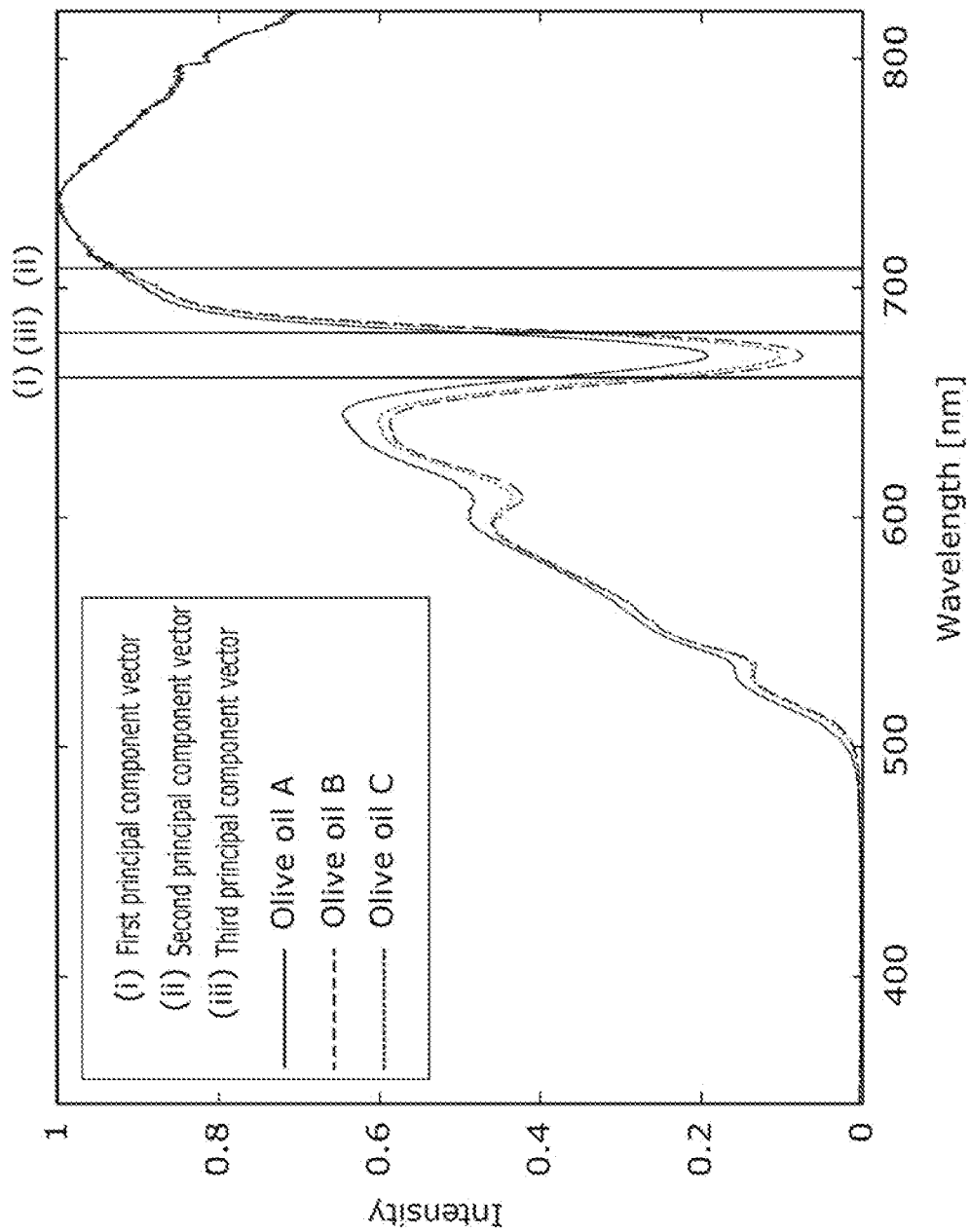
FIG. 13 is a diagram illustrating three measurement wavelengths obtained through the sparse principal component analysis illustrated in FIG. 10.

FIG. 13 is a diagram illustrating three measurement wavelengths obtained through the sparse principal component analysis illustrated in FIG. 10. In the diagram, (i) a first principal component vector, (ii) a second principal component vector, and (iii) a third principal component vector are the three measurement wavelengths obtained through the sparse principal component analysis conducted in the experiment.

In the manufacture of optical detection device 10, the positions of the three or more slits in second slit array 18 are determined so that the three or more slits include slits each of which passes a light beam of a different one of the three measurement wavelengths illustrated in FIG. 13 which are obtained through such a sparse principal component analysis, Specifically, a spectrometer (i.e., a main scale) is configured so that the spectra, which are output from the spectrometer including, for instance, diffraction grating 16, are arranged in such a manner that a displacement between adjacent spectra is 151.2 μm. In addition, the array of the slits in second slit array 18 and imaging element 19 (i.e., a secondary scale) are configured so that (i) a wavelength is detected every 166.32 μm in the alignment of the spectra that are output, and that (ii) each of the light beams, which have passed through the three slits located at the positions corresponding to the three measurement wavelengths obtained through the sparse principal component analysis and illustrated in FIG. 13, is detected. The wavelength resolution obtained by the main scale and the secondary scale was 0.125 nm.

Note that light beams of wavelengths other than those (the three wavelengths mentioned above) corresponding to locations characteristic to the spectrum of the input light may be excluded in advance using a wavelength filter or the like, so that the light beams do not pass through the slits in second slit array 18.

Figure 14:
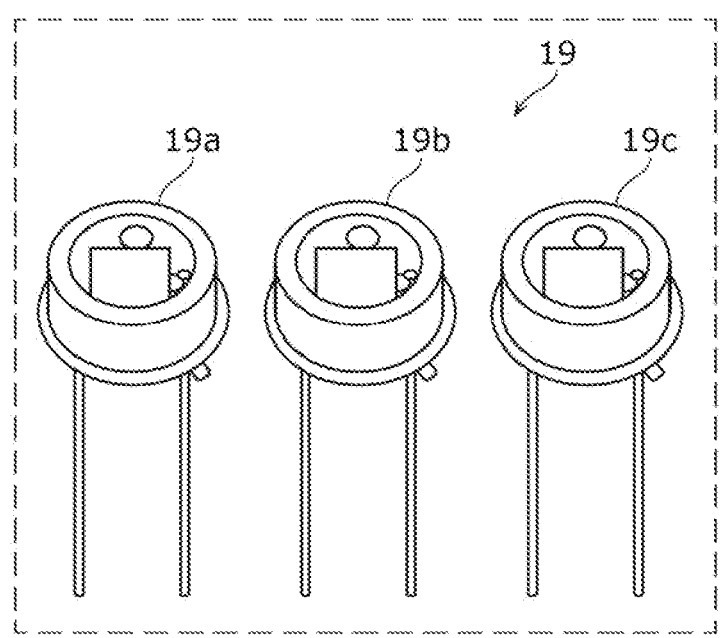
FIG. 14 is a diagram illustrating an example of an imaging element (three photosensors) included in the optical detection device according to the embodiment.

Moreover, an array of three photosensors 19a to 19c (i.e., a photosensor array) may be used as imaging element 19, as illustrated in FIG. 14. Furthermore, photosensors 19a to 19c in imaging element 19 (a photosensor array, for instance) do not need to be equally spaced apart as long as the light beams having passed through the slits located at the positions corresponding to the measurement wavelengths are detected.

(Experiment 1)

An experiment of measuring the transmission spectra of olive oils A, B, and C whose types are known is conducted using optical detection device 10 manufactured according to the design method described above. The following describes the details and result of the experiment.

Figure 15:
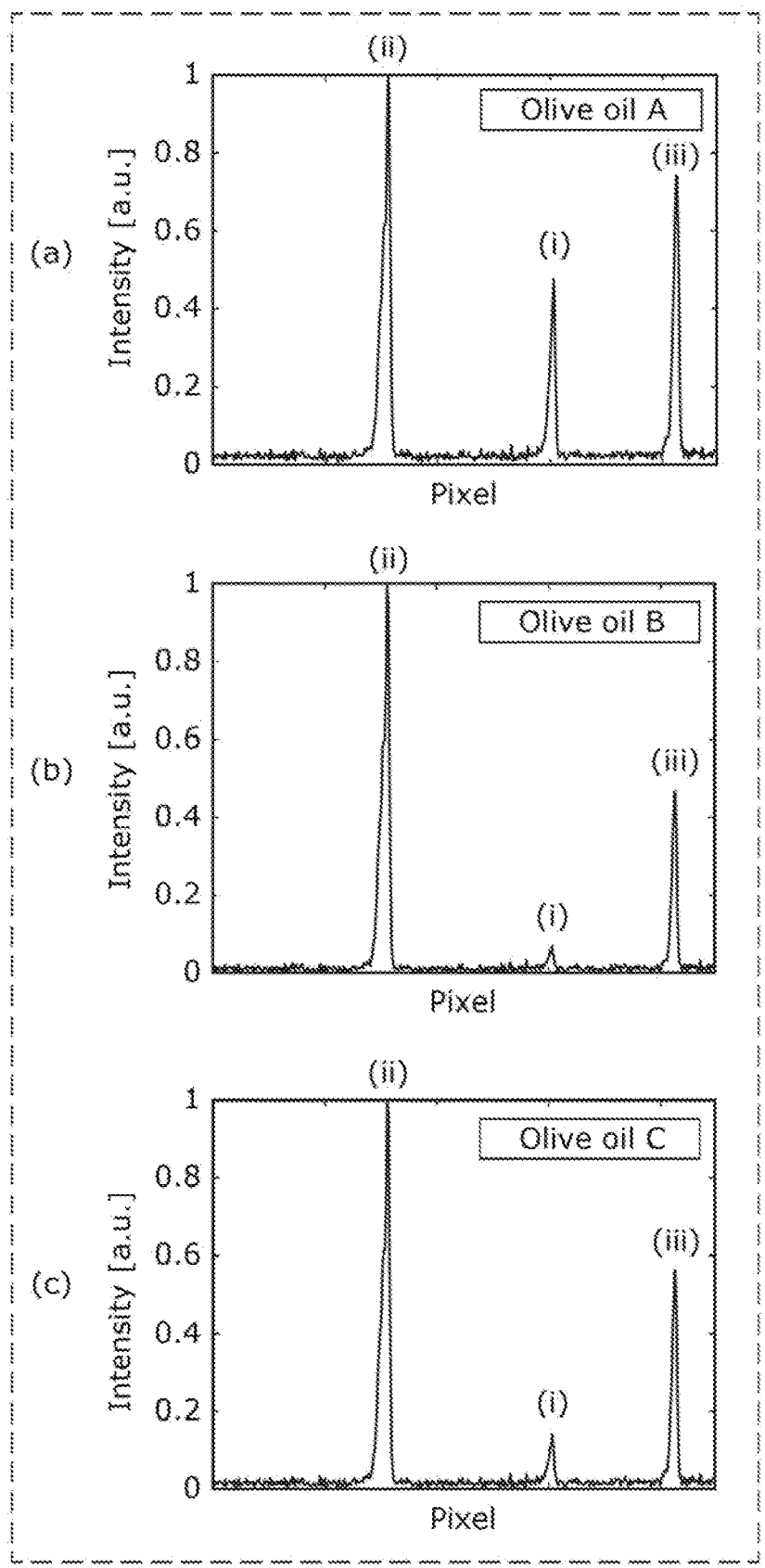
FIG. 15 is a diagram illustrating examples of three wavelength components obtained through measurement performed by the optical detection device in Experiment 1.

FIG. 15 is a diagram illustrating examples of three wavelength components obtained through the measurement performed by optical detection device 10 in Experiment 1. More specifically, (a), (b), and (c) in FIG. 15 illustrate representative examples of three wavelength components obtained through the measurement of olive oils A, B, and C, respectively.

Figure 16:
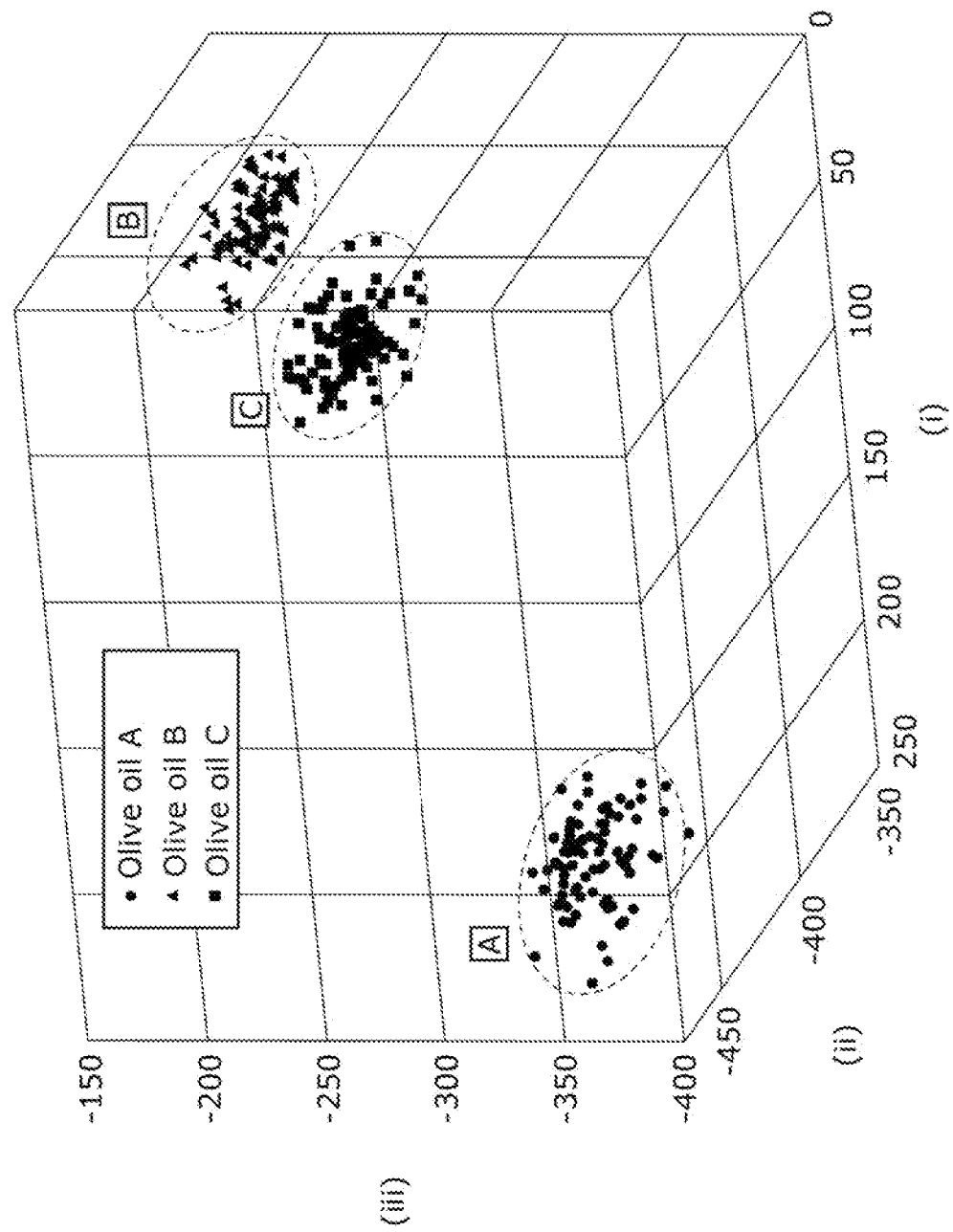
FIG. 16 is a diagram illustrating, in a three-dimensional distribution, results of the measurement performed by the optical detection device which are illustrated in FIG. 15.

FIG. 16 is a diagram illustrating, in a three-dimensional distribution, measurement results obtained by optical detection device 10 which are illustrated in FIG. 15. In the diagram, each of the measurement results of olive oils A, B, and C is plotted in a three-dimensional space formed by axes corresponding to each of the three wavelength components (black circles, black triangles, and black squares), Each of the plots corresponds to a different one of the measurement results (three wavelength components) of the olive oils.

As indicated in areas each enclosed by a dashed oval in FIG. 16, the measurement results of olive oils A, B, and C are dispersed in separate regions without overlapping each other in a three-dimensional space corresponding to the three wavelength components. This shows that in order to determine the type of an olive oil whose type is unknown, it is normally required to analyze the transmission spectrum of the olive oil, which is formed by 1000 points, but with optical detection device 10 according to the present embodiment, it is possible to determine the type of the olive oil using the result of measuring only three wavelength components. In other words, this shows that the data reduction rate of 99.7% is achieved.

Although the transmission spectrum of an olive oil is measured in the present experiment, an absorption spectrum may be measured depending on a target sample.

Figure 17:
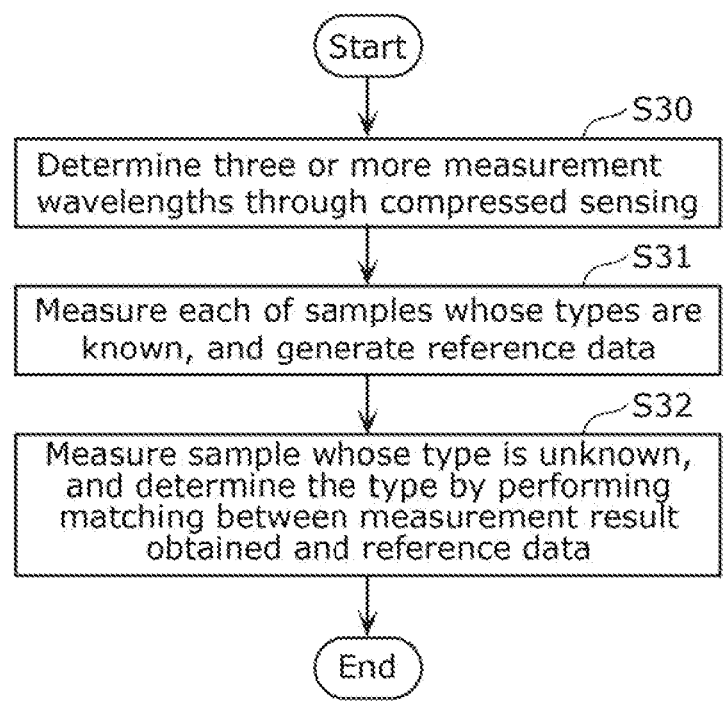
FIG. 17 is a flow chart illustrating a sample classification method utilizing knowledge obtained through Experiment 1.

FIG. 17 is a flow chart illustrating a sample classification method utilizing knowledge obtained through Experiment 1. The flow chart shows a procedure of the sample classification method for determining the type of a sample whose type is unknown, using optical detection device 10 according to the present embodiment.

First, a spectrum, either a transmission spectrum or an absorption spectrum, is obtained for each of samples, and three or more measurement wavelengths to be used for reconstructing the spectrum are determined through compressed sensing performed on spectra obtained (measurement wavelength determination step S30). This step is, for example, the processes in step S20 (steps S20a and 520b) (i.e., the sparse principal component analysis) illustrated in FIG. 10.

Subsequently, the wavelength components of the three or more measurement wavelengths determined in measurement wavelength determination step S30 are measured for each of samples whose types are known, using optical detection device 10 according to the present embodiment, and reference data in which a measurement result obtained is associated with the corresponding type of the sample is generated (reference data generation step S31). This process is, for example, the process described with reference to FIG. 15 and FIG. 16. The reference data is, for example, the data illustrated in FIG. 16.

Lastly, the wavelength components of the three or more measurement wavelengths determined in measurement wavelength determination step S30 are measured for a sample whose type is unknown, using optical detection device 10 according to the present embodiment. The type of the sample is determined by performing matching between a measurement result obtained and the reference data generated in reference data generation step S31. (determination step S32). For example, by determining which of the regions in the distribution illustrated in FIG. 16 the wavelength components of the three or more measurement wavelengths, which are obtained from the sample whose type is unknown, belong to, the type corresponding to the region to which the wavelength components belong is obtained as a determination result. When there are plural samples whose types are desired to be determined, determination step S32 is repeated for these samples.

With such a sample classification method, it is possible to determine the type of a sample using only three points of wavelength components, thereby achieving high-speed sample classification performed by optical detection device 10 including simple imaging element 19.

Note that in the sample classification method according to the present experiment, three or more measurement wavelengths are determined through compressed sensing (S30) to utilize optical detection device 10 according to the present embodiment. However, as far as the sample classification method is concerned, the number of measurement wavelengths is not necessarily limited to three or more, and may be less than three. For example, when the number of principal components obtained through a sparse principal component analysis is two, the number of measurement wavelengths may be two. In short, as far as the sample classification method is concerned, the number of measurement wavelengths may be any number as long as compressed sensing can be performed, and specifically, may be set to a number obtained through the sparse principal component analysis.

(Experiment 2)

Next, an experiment of detecting defective olive oils is conducted using optical detection device 10 used in Experiment 1. The following describes the details and result of the experiment. In the experiment, samples each containing olive oil B defined as a good product and olive oil A defined as a defective product at various contamination rates (50 samples for each of the various contamination rates here) are prepared, and the samples are measured using optical detection device 10 according to the present embodiment.

Figure 18:
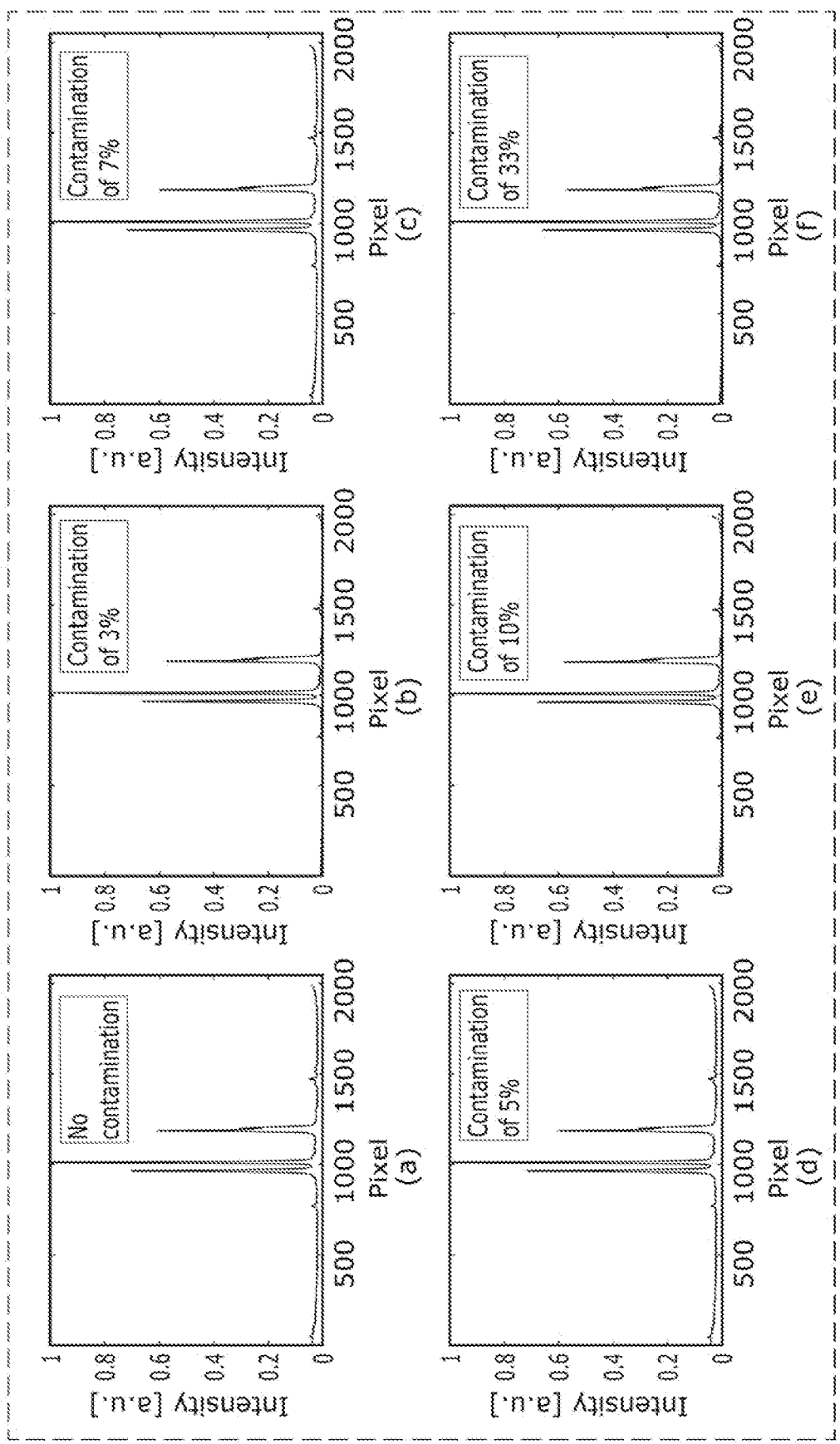
FIG. 18 is a diagram illustrating examples of three wavelength components obtained through measurement performed by the optical detection device in Experiment 2.

FIG. 18 is a diagram illustrating examples of three wavelength components obtained through the measurement performed by optical detection device 10 in Experiment 2. More specifically, (a), (b), (c), (d), (e), and (f) in FIG. 18 illustrate representative examples of the three wavelength components obtained through the measurement of the samples with the contamination rates of 0 wt %, 3 wt %, 5 wt %, 7 wt %, 10 wt %, and 33 wt %, respectively.

Figure 19:
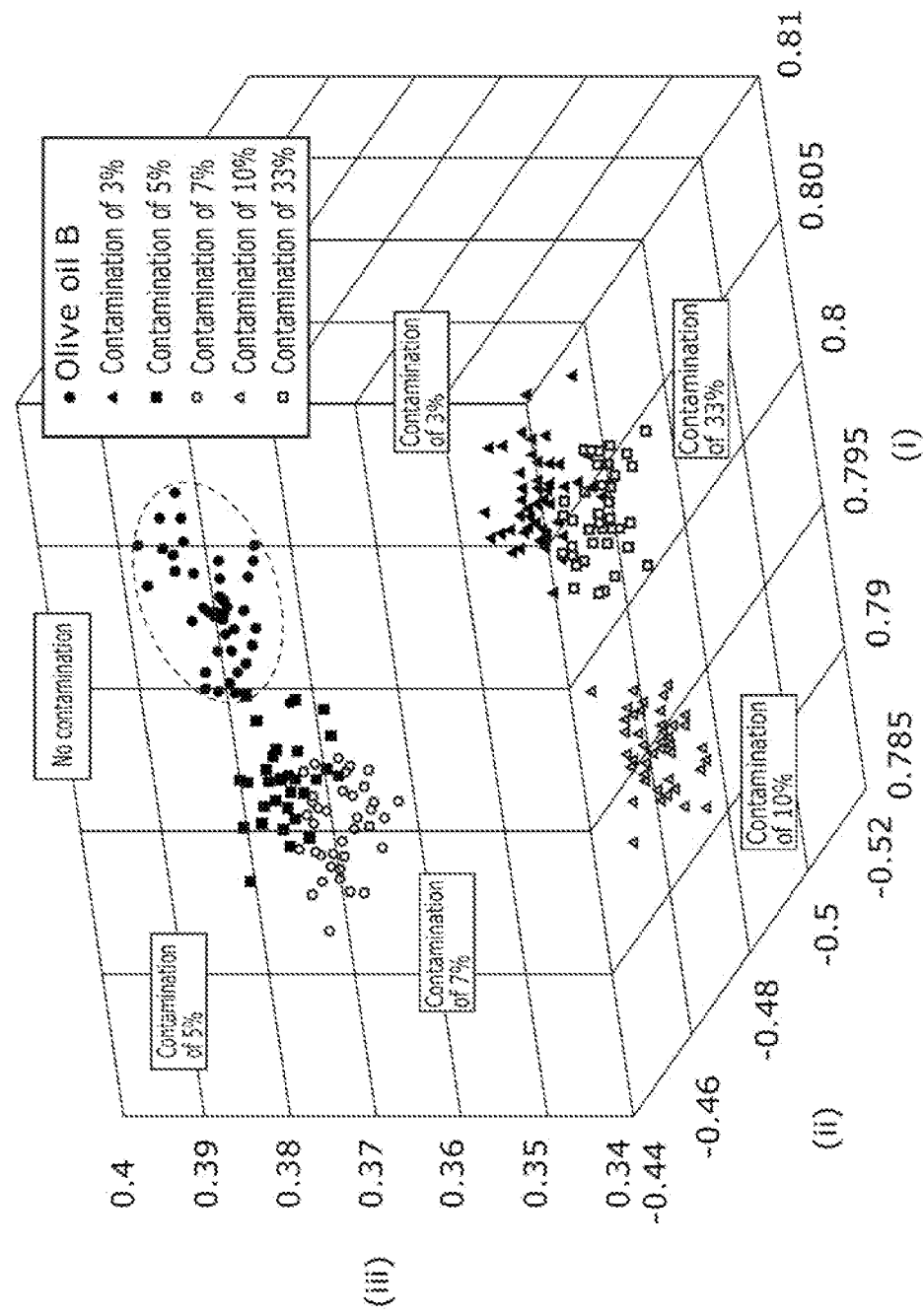
FIG. 19 is a diagram illustrating, in a three-dimensional distribution, results of the measurement performed by the optical detection device which are illustrated in FIG. 18.

FIG. 19 is a diagram illustrating, in a three-dimensional distribution, measurement results obtained by optical detection device 10 which are illustrated in FIG. 18. In the diagram, the measurement results of each sample are plotted in a three-dimensional space formed by axes corresponding to each of the three wavelength components. Each of the plots corresponds to a different one of the measurement results (three wavelength components) of each sample. In the diagram, black circles, black triangles, black squares, white circles, white triangles, and white squares present the measurement results of the samples with the contamination rates of 0 wt %, 3 wt %, 5 wt %, 7 wt %, 10 wt %, and 33 wt %, respectively.

Figures 20, 21:
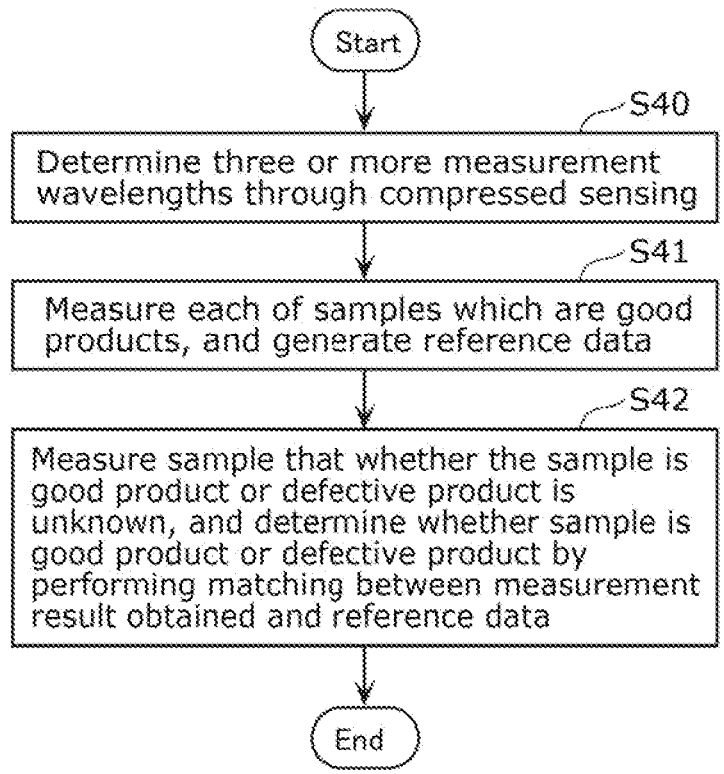
FIG. 20 is a diagram illustrating results of calculating defect detection rates from the results of the measurement performed by the optical detection device which are illustrated in FIG. 18.
FIG. 21 is a flow chart illustrating a sample defect detection method utilizing knowledge obtained through Experiment 2.

FIG. 20 is a diagram illustrating results of calculating defect detection rates from the results of the measurement performed by optical detection device 10 which are illustrated in FIG. 18. The defect detection rates are each calculated based on the distance from the center of the distribution of samples with the contamination rate of 0 wt %. In other words, the defect detection rate is calculated by determining that a defect is "detected" when a sample in which a defective product is contained is located outside a region in which the samples with the contamination rate of 0 wt % are dispersed, and determining that a defect is "not detected" when a sample in which a defective product is contained is located in the region. As can be seen from the diagram, it is possible to detect, with an extremely high detection rate, the samples each with a defective product contained at the various contamination rates.

FIG. 21 is a flow chart illustrating a sample defect detection method utilizing knowledge obtained through Experiment 2. The flow chart shows a procedure of the defect detection method for determining whether a sample that whether the sample is a good product or a defective product is unknown is a good product or a defective product, using optical detection device 10 according to the present embodiment.

First, a spectrum, either a transmission spectrum or an absorption spectrum, is obtained for each of samples, and three or more measurement wavelengths to be used for reconstructing the spectrum are determined through compressed sensing performed on spectra obtained (measurement wavelength determination step S40), This step is, for example, the processes in step S20 (steps S20a and 520b) (i.e., the sparse principal component analysis) in FIG. 10.

Subsequently, the wavelength components of the three or more measurement wavelengths determined in measurement wavelength determination step S40 are measured for each of samples which are good products, using optical detection device 10 according to the present embodiment, and reference data indicating measurement results obtained is generated (reference data generation step S41). This process is, for example, the processes described with reference to (a) in FIG. 18 and FIG. 19 (black circle plots). The reference data is, for example, the data of black circle plots illustrated in FIG. 19.

Lastly, the wavelength components of the three or more measurement wavelengths determined in measurement wavelength determination step S40 are measured for a sample that whether the sample is a good product or a defective product is unknown, using optical detection device 10 according to the present embodiment. Whether the sample is a good product or a defective product is determined by performing matching between a measurement result obtained and the reference data generated in reference data generation step S41 (determination step S42), For example, when the wavelength components of the three or more measurement wavelengths, which are obtained from a sample that whether the sample is a good product or a defective product is unknown, belong to a distribution region indicated by black circle plots in FIG. 19, the sample is determined as a good product, and in the case otherwise, the sample is determined as a defective product. When there are plural samples that whether each of the samples is a good product or a defective product is desired to be determined, determination step S42 is repeated for these samples.

With such a defect detection method, it is possible to determine whether a sample is good or defective using only three points of wavelength components, thereby achieving high-speed defect detection by optical detection device 10 including simple imaging element 19.

Note that in the defect detection method according to the present experiment, three or more measurement wavelengths are determined through compressed sensing (S40) to utilize optical detection device 10 according to the present embodiment. However, as far as the defect detection method is concerned, the number of measurement wavelengths is not necessarily limited to three or more and may be less than three. For example, when the number of principal components obtained through a sparse principal component analysis is two, the number of measurement wavelengths may be two. In short, as far as the defect detection method is concerned, the number of measurement wavelengths may be any number as long as compressed sensing can be performed, and specifically, may be set to a number obtained through the sparse principal component analysis.

Note that such defect detection method and the sample classification method described above can be implemented using optical detection device 10 according to the present embodiment and a computer device (any type of an input/output device including a storage device that holds a program, reference data, etc., a processor that executes the program, an A/D converter that obtains the intensity of light, etc.) which obtains the intensity of light detected by optical detection device 10 according to the present embodiment, to perform information processing.

As described above, optical detection device 10 according to the present embodiment is an optical detection device that detects a desired wavelength component included in input light, and includes: a spectrometer including, for instance, diffraction grating 16 that receives the input light as an input and outputs an alignment of spectra each of which is a duplication of a spectrum of the input light; second slit array 18 including an array of three or more slits that pass light beams of wavelengths at three or more locations in the alignment of the spectra that are output from the spectrometer; and imaging element 19 composed of an array of pixels that receive the light beams having passed through second slit array 18, each of the light beams having three or more wavelength components. At least two pitches between slits are different in the array of the three or more slits.

Accordingly, slits included in second slit array 18 are not arranged at a constant pitch unlike a conventional case, but are arranged at locations corresponding to the wavelengths of wavelength components desired to be detected in the alignment of spectra. Thus, even when the wavelengths of wavelength components desired to be detected are separated by a wide wavelength range, the wavelength components are detected with high wavelength resolution by utilizing the Vernier effect.

In the alignment of the spectra, parts of adjacent spectra spatially overlap each other, and at least one of the three or more slits included in second slit array 18 passes a light beam having wavelength components corresponding to a same spatial location in spectra having parts spatially overlapping each other in the alignment of the spectra.

Accordingly, at least one light beam having passed through at least one of slits included in second slit array 18 includes wavelength components corresponding to the same location in the spectra. However, since input light includes desired wavelength components, the wavelength of a light beam, which is detected for each of the slits, is identified with high wavelength resolution, Thus, even when the wavelengths of wavelength components desired to be detected are separated by a wide wavelength range, the wavelength components are detected with high wavelength resolution.

As one example, each of the spectra includes a first peak and a second peak, and the three or more slits in second slit array 18 include a slit that passes a light beam of a wavelength corresponding to the first peak and a slit that passes a light beam of a wavelength corresponding to the second peak.

Accordingly, a desired wavelength component is detected with high wavelength resolution for each of two peaks separated by a wide wavelength range.

The array of pixels in imaging element 19 may include as many pixels as necessary for reception of light in a desired wavelength range, and the first peak and the second peak may be separated by a wavelength range greater than a wavelength range equivalent to a displacement between adjacent spectra in the alignment of the spectra. Note that the desired wavelength range is a wavelength range that includes desired wavelength components.

Accordingly, a desired wavelength component is detected with high wavelength resolution for each of two peaks separated by a wide wavelength range in input light of wide range which could not be observed at one time with the conventional technique.

An optical detection method according to the present embodiment is a method for detecting a desired wavelength component included in input light, and includes: upon receiving the input light as an input, outputting an alignment of spectra, each of which is a duplication of a spectrum of the input light; passing, by second slit array 18 including an array of three or more slits, light beams of wavelengths at three or more locations in the alignment of the spectra that are output; and detecting, by imaging element 19 composed of an array of pixels, the light beams that have passed through second slit array 18, each of the light beams having three or more wavelength components. At least two pitches between slits are different in the array of the three or more slits.

Accordingly, slits included in second slit array 18 can be arranged in advance to positions corresponding to the wavelengths of wavelength components desired to be detected in the alignment of spectra, Thus, even when the wavelengths of wavelength components desired to be detected are separated by a wide wavelength range, the wavelength components are detected with high wavelength resolution by utilizing the Vernier effect.

A method for designing optical detection device 10 according to the present embodiment is a method for designing optical detection device 10 that detects a desired wavelength component included in input light. Optical detection device 10 includes: a spectrometer including, for instance, diffraction grating 16 that receives the input light as an input and outputs an alignment of spectra each of which is a duplication of a spectrum of the input light; second slit array 18 including an array of three or more slits that pass light beams of wavelengths at three or more locations in the alignment of the spectra that are output from the spectrometer; and imaging element 19 composed of an array of pixels that receive the light beams having passed through second slit array 18, each of the light beams having three or more wavelength components. The method includes: determining positions of the three or more slits in second slit array 18 so that the three or more slits in second slit array include a slit that passes a light beam of a wavelength corresponding to a location that is characteristic to the spectrum of the input light.

Accordingly, slits included in second slit array 18 are not arranged at a constant pitch unlike a conventional case, but are arranged at locations corresponding to the wavelengths of wavelength components desired to be detected in the alignment of spectra. Thus, an optical detection device capable of detecting, with high wavelength resolution, wavelength components desired to be detected, by utilizing the Vernier effect even when the wavelengths of the wavelength components are separated by a wide wavelength range, is manufactured.

Each of the spectra includes a first peak and a second peak, and in the determining of the positions, the positions of the three or more slits in second slit array 18 may be determined so that the three or more slits include a slit that passes a light beam of a wavelength corresponding to the first peak and a slit that passes a light beam of a wavelength corresponding to the second peak Accordingly, an optical detection device that detects the wavelength components of the first peak and the second peak which characterize each of the spectra is manufactured.

The design method according to the present embodiment includes, prior to the determining of the positions, obtaining spectra of the input light, and determining, through compressed sensing performed on the spectra obtained, three or more measurement wavelengths to be used for reconstructing each of the spectra. In the determining of the positions, the positions of the three or more slits in second slit array 18 are determined so that the three or more slits include slits each of which passes a light beam of a different one of the three or more measurement wavelengths determined in the determining of the three or more measurement wavelengths.

Accordingly, the number of wavelengths necessary for measurement is narrowed down through compressed sensing, and an optical detection device, having a simple configuration and capable of high-speed processing, which detects light of fewer measurement wavelengths to analyze input light is manufactured.

In the determining of the three or more measurement wavelengths, the three or more measurement wavelengths in each of the spectra are determined by applying a sparse principal component analysis to the spectra obtained. Accordingly, the number of necessary measurement wavelengths is surely reduced.

A sample classification method according to the present embodiment is a sample classification method for classifying a type of a sample, and includes: obtaining a spectrum for each of samples and determining, through compressed sensing performed on spectra obtained, three or more measurement wavelengths to be used for reconstructing the spectrum, the spectrum being a transmission spectrum or an absorption spectrum; (i) measuring, for each of samples whose types are known, wavelength components of the three or more measurement wavelengths, using optical detection device 10 described above, and (ii) generating reference data in which a measurement result obtained is associated with a corresponding one of the types; and (i) measuring, for a sample whose type is unknown, wavelength components of the three or more measurement wavelengths, using optical detection device 10 described above, and (ii) determining a type of the sample by performing matching between a measurement result obtained and the reference data.

This enables the classification of samples by detecting light of measurement wavelengths reduced in number using compressed sensing, thereby enabling high-speed classification performed by a simple optical detection device. Thus, an industrial analyzer that classifies samples in-line in the processes of, for instance, manufacture, classification, and inspection is achieved.

A defect detection method according to the present embodiment is a defect detection method for detecting a defective sample, and includes: obtaining a spectrum for each of samples and determining, through compressed sensing performed on spectra obtained, three or more measurement wavelengths to be used for reconstructing the spectrum, the spectrum being a transmission spectrum or an absorption spectrum; (i) measuring, for each of samples that are good products, wavelength components of the three or more measurement wavelengths, using optical detection device 10 described above, and (ii) generating reference data indicating a measurement result obtained; and (i) measuring, for a sample that whether the sample is a good product or a defective product is unknown, wavelength components of the three or more measurement wavelengths, using optical detection device 10 described above, and (ii) determining whether the sample is a good product or a defective product by performing matching between a measurement result obtained and the reference data.

This enables determination on whether a sample is good or defective by detecting light of measurement wavelengths reduced in number using compressed sensing, thereby enabling high-speed defect detection performed by a simple optical detection device. Thus, an industrial analyzer that detects defective samples in-line in the processes of, for instance, manufacture, classification, and inspection is achieved.

Optical detection device 10 according to the above embodiment detects, with high wavelength resolution, a wavelength signal of wide range by utilizing the cyclicity of a vernier scale component in an output wavelength, which owes to the Vernier effect. However, optical detection device 10 may utilize the cyclicity of a vernier scale component in an output wavelength, which owes to a moiré effect. For example, an optical detection device according to a variation includes: a fringe former which is a spectrometer that measures a spectrum of input light and which forms a first fringe with a first pitch by separating the input light; a diffraction grating that disperses the first fringe; a moiré pattern former that forms a moiré pattern by overlaying the first fringe on a second fringe formed with a second pitch different from the first pitch; and an imaging element that measures the spectrum of the input light by detecting the moiré pattern. At least one of the fringe former and the moiré pattern former may be a cylindrical lens array. With such a configuration, it is possible to detect, with high wavelength resolution, a wavelength signal of wide range, like the case described in the above embodiment, by utilizing the cyclicity of a vernier scale component in an output wavelength, which owes to a moiré effect.

Moreover, the Vernier effect according to the present invention is produced by a relative spatial positional relationship between first slit array 13 and second slit array 18, and the aforementioned embodiment may be implemented by replacing first slit array 13 and second slit array 18 with each other, or configuring first slit array 13 and/or second slit array 18 to include both first slit array 13 and second slit array 18.

Although the optical detection device, the optical detection method, the optical detection device design method, the sample classification method, and the defect detection method according to the present invention have been described based on the embodiment, a variation thereof, application examples, and experiment examples, the present invention is not limited to these. The scope of the present invention encompasses various modifications that may be conceived by those skilled in the art to the embodiment, the variation, the application examples, and the experiment examples, and embodiments achieved by combining one or more of structural elements in the embodiment, the variation, the application examples, and the experiment examples, without departing from the scope of the present invention.

INDUSTRIAL APPLICABILITY

The present invention can be utilized as an optical detection device that detects desired wavelength components included in input light, for example, as a device that detects the wavelength components of reflected light that is output from an FBG or the wavelength components of Raman scattered light obtained by a Raman spectrophotometer. For wider applications, the present invention can be utilized as a core engine (a spectrometer) used in an interrogator in optical fiber sensing and also as an industrial analyzer that analyzes samples in-line in processes such as manufacture, classification, and inspection.

The invention claimed is:

1. An optical detection device that detects a desired wavelength component included in input light, the optical detection device comprising:
   a spectrometer that receives the input light as an input and outputs, at a first pitch, an alignment of spectra each of which is a duplication of a spectrum of the input light;
   a slit array including an array of three or more slits that pass light beams of wavelengths at three or more locations in the alignment of the spectra that are output from the spectrometer; and
   an imaging element composed of an array of pixels that receive the light beams having passed through the slit array, each of the light beams having three or more wavelength components separated by a fixed wavelength range so that the three or more wavelength components are shifted from each other in a fixed wavelength cycle, wherein
   at least two pitches between slits are different in the array of the three or more slits, and
   a second pitch that is one of the at least two pitches is different from the first pitch.

2. The optical detection device according to claim 1, wherein
   in the alignment of the spectra, parts of adjacent spectra spatially overlap each other, and
   at least one of the three or more slits passes a light beam having wavelength components corresponding to a same spatial location in spectra having parts spatially overlapping each other in the alignment of the spectra.

3. The optical detection device according to claim 1, wherein
   each of the spectra includes a first peak and a second peak, and
   the three or more slits include a slit that passes a light beam of a wavelength corresponding to the first peak and a slit that passes a light beam of a wavelength corresponding to the second peak.

4. The optical detection device according to claim 3, wherein
   the array of pixels receives light in a desired wavelength range, and
   the first peak and the second peak are separated by a wavelength range greater than a wavelength range equivalent to the first pitch.

5. A sample classification method for classifying a type of a sample, the sample classification method comprising:
   obtaining a spectrum for each of samples and determining, through compressed sensing performed on spectra obtained, three or more measurement wavelengths to be used for reconstructing the spectrum, the spectrum being a transmission spectrum or an absorption spectrum;

(i) measuring, for each of samples whose types are known, wavelength components of the three or more measurement wavelengths, using the optical detection device according to claim 1, and (ii) generating reference data in which a measurement result obtained by measuring the samples whose types are known is associated with a corresponding one of the types; and (i) measuring, for a sample whose type is unknown, wavelength components of the three or more measurement wavelengths, using the optical detection device, and (ii) determining a type of the sample by performing matching between a measurement result obtained by measuring the sample whose type is unknown and the reference data.

6. A defect detection method for detecting a defective sample, the defect detection method comprising:

obtaining a spectrum for each of samples and determining, through compressed sensing performed on spectra obtained, three or more measurement wavelengths to be used for reconstructing the spectrum, the spectrum being a transmission spectrum or an absorption spectrum;

(i) measuring, for each of samples that are good products, wavelength components of the three or more measurement wavelengths, using the optical detection device according to claim 1, and (ii) generating reference data indicating a measurement result obtained by measuring the samples that are good products; and (i) measuring, for a sample that whether the sample is a good product or a defective product is unknown, wavelength components of the three or more measurement wavelengths, using the optical detection device, and (ii) determining whether the sample is a good product or a defective product by performing matching between a measurement result obtained by measuring the sample that whether the sample is a good product or a defective product is unknown and the reference data.

7. An optical detection method for detecting a desired wavelength component included in input light, the optical detection method comprising:

upon receiving the input light as an input, outputting, at a first pitch, an alignment of spectra, each of which is a duplication of a spectrum of the input light;

passing, by a slit array including an array of three or more slits, light beams of wavelengths at three or more locations in the alignment of the spectra that are output; and detecting, by an imaging element composed of an array of pixels, the light beams that have passed through the slit array, each of the light beams having three or more wavelength components separated by a fixed wavelength range so that the three or more wavelength components are shifted from each other in a fixed wavelength cycle, wherein at least two pitches between slits are different in the array of the three or more slits, and a second pitch that is one of the at least two pitches is different from the first pitch.

8. A method for designing an optical detection device that detects a desired wavelength component included in input light, the optical detection device including:

a spectrometer that receives the input light as an input and outputs, at a first pitch, an alignment of spectra each of which is a duplication of a spectrum of the input light;

a slit array including an array of three or more slits that pass light beams of wavelengths at three or more locations in the alignment of the spectra that are output from the spectrometer; and an imaging element composed of an array of pixels that receive the light beams having passed through the slit array, each of the light beams having three or more wavelength components separated by a fixed wavelength range so that the three or more wavelength components are shifted from each other in a fixed wavelength cycle, wherein at least two pitches between slits are different in the array of the three or more slits, and a second pitch that is one of the at least two pitches is different from the first pitch, the method comprising:

determining positions of the three or more slits in the slit array so that the three or more slits include a slit that passes a light beam of a wavelength corresponding to a location that is characteristic to the spectrum of the input light; and fabricating the optical detection device in accordance with a final design obtained by performing the method.

9. The method according to claim 8, wherein each of the spectra includes a first peak and a second peak, and in the determining of the positions, the positions of the three or more slits in the slit array are determined so that the three or more slits include a slit that passes a light beam of a wavelength corresponding to the first peak and a slit that passes a light beam of a wavelength corresponding to the second peak.

10. The method according to claim 8, further comprising:

prior to the determining of the positions, obtaining the spectra of the input light, and determining, through compressed sensing performed on the spectra obtained, three or more measurement wavelengths to be used for reconstructing each of the spectra, wherein in the determining of the positions, the positions of the three or more slits in the slit array are determined so that the three or more slits include slits each of which passes a light beam of a different one of the three or more measurement wavelengths determined in the determining of the three or more measurement wavelengths.

11. The method according to claim 10, wherein in the determining of the three or more measurement wavelengths, the three or more measurement wavelengths in each of the spectra are determined by applying a sparse principal component analysis to the spectra obtained.

* * * * *